(12) United States Patent
Akiyama

(10) Patent No.: US 11,119,278 B2
(45) Date of Patent: Sep. 14, 2021

(54) OPTICAL DEMULTIPLEXER, OPTICAL TRANSPORT APPARATUS, AND METHOD OF CONTROLLING OPTICAL DEMULTIPLEXING

(71) Applicants: FUJITSU LIMITED, Kawasaki (JP); Photonics Electronics Technology Research Association, Tokyo (JP)

(72) Inventor: Tomoyuki Akiyama, Yokohama (JP)

(73) Assignees: FUJITSU LIMITED, Kawasaki (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 16/884,244

(22) Filed: May 27, 2020

(65) Prior Publication Data

US 2020/0379181 A1  Dec. 3, 2020

(30) Foreign Application Priority Data

May 29, 2019  (JP) .............................. JP2019-100439

(51) Int. Cl.
  *G02B 6/293* (2006.01)
  *H04J 14/02* (2006.01)

(52) U.S. Cl.
  CPC ....... *G02B 6/29352* (2013.01); *G02B 6/2938* (2013.01); *G02B 6/29395* (2013.01); *H04J 14/02* (2013.01)

(58) Field of Classification Search
  None
  See application file for complete search history.

(56) References Cited

U.S. PATENT DOCUMENTS 6,263,126 B1 * 7/2001 Cao .................... G02B 6/29349
                                                                 385/24
6,560,381 B2 * 5/2003 Hatayama .......... G02B 6/12007
                                                                 359/337.2

(Continued)

FOREIGN PATENT DOCUMENTS

JP        63-46022    2/1988
JP      2002-71978    3/2002

(Continued)

*Primary Examiner* — Rhonda S Peace
(74) *Attorney, Agent, or Firm* — Staas & Halsey, LLP

(57) ABSTRACT

An optical demultiplexer is disclosed that separates light including a plurality of wavelengths into light of respective wavelengths. Unit circuits are cascaded in a tree structure. In optical demultiplexer components having the same structure, a combination of arm length differences in waveguide pairs is the same with respect to the N−1 Asymmetric Mach-Zehnder interferometers in which the phase shifters are arranged, where N equals number of 2×2 couplers. In three of the optical demultiplexer components in at least one of the unit circuits, N is three or more. Each of control circuits controls the phase shifters arranged in a corresponding optical demultiplexer component of a corresponding unit circuit in order to increase or decrease a value of a function having, as an argument, a power value acquired by a monitor from among monitors arranged at four optical waveguides at an output side of the corresponding unit circuit.

6 Claims, 18 Drawing Sheets

(56) References Cited

U.S. PATENT DOCUMENTS

| | | | | |
|---|---|---|---|---|
| 6,947,631 | B2* | 9/2005 | Arai | G02B 6/12004 |
| | | | | 385/15 |
| 7,085,438 | B2* | 8/2006 | Mizuno | G02B 6/12007 |
| | | | | 385/15 |
| 9,780,903 | B2* | 10/2017 | Okayama | H04J 14/02 |
| 10,491,321 | B2* | 11/2019 | Akiyama | G02B 6/2935 |
| 2001/0024543 | A1* | 9/2001 | Ahmadvand | G02B 6/2938 |
| | | | | 385/24 |
| 2001/0048786 | A1* | 12/2001 | Arai | G02B 6/29355 |
| | | | | 385/24 |
| 2002/0106147 | A1 | 8/2002 | Kitoh et al. | |
| 2020/0379181 | A1* | 12/2020 | Akiyama | G02B 6/29355 |

FOREIGN PATENT DOCUMENTS

| | | |
|---|---|---|
| JP | 2002-318376 | 10/2002 |
| JP | 2003-149472 | 5/2003 |
| JP | 2014-182259 | 9/2014 |

\* cited by examiner

OPTICAL DEMULTIPLEXER, OPTICAL TRANSPORT APPARATUS, AND METHOD OF CONTROLLING OPTICAL DEMULTIPLEXING

CROSS-REFERENCE TO RELATED APPLICATIONS

This application is based upon and claims priority to earlier filed Japanese Patent Application No. 2019-100439 filed May 29, 2019, the entire contents of which are incorporated herein by reference.

FIELD

The present invention relates to an optical demultiplexer, an optical transport apparatus, and a method of controlling optical demultiplexing.

BACKGROUND

Due to global spread of the internet and an increase in "things" connected to the internet, the amount of data traffic has dramatically increased, and an improvement of a transmission capacity and a transmission speed is required. The performance of an information processing system is determined by a processing speed of a computing device and the transmission speed of a mutually coupling medium. Regarding the computing device, research and studies are continuously made on scaling or miniaturization of silicon integrated circuits. Following the scaling of IC devices, scaling of the mutually coupled medium and an improvement of an operation speed are also required. In the future, further downsizing and high-speed operation will be desired for the entirety of a transmission system.

For a downsizing and an increase of speed of systems, mutual coupling in optical transmission using silicon integrated circuits and fiber optic cables is attracting attention. One solution for increasing the number of channels per fiber is a technique of wavelength division multiplexing (WDM). At a receiving end, a WDM signal is demultiplexed into light signals with different wavelengths.

An optical demultiplexer in which a plurality of delay-line Mach-Zehnder (MZ) interferometers are cascaded is known. In this architecture, two outputs of a first delay-line MZ interferometer are connected to an input of a second delay-line MZ interferometer and an input of a third delay-line MZ interferometer, respectively. Each of the second delay-line MZ interferometer and the third delay-line MZ interferometers has half the path length difference in the first delay-line MZ interferometer (see, for example, Patent Document 1 listed below).

An optical demultiplexer in which a plurality of directional optical couplers are cascaded, is also known (see, for example, patent Document 2 listed below). With this architecture, each directional optical coupler has an input port, an output port, and two optical waveguides extending between the input port and the output port. The relative effective path lengths of the two optical waveguides are regulated such that the direct current component of the optical signal detected from the output of the optical demultiplexer becomes the maximum.

LIST OF DOCUMENTS

Patent Document 1:
Japanese Patent Application Laid-open No. 2014-182259
Patent Document 2:
Japanese Patent Application Laid-open NO. 63-46022
Patent Document 3:
Japanese Patent Application Laid-open NO. 2003-149472
Patent Document 4:
Japanese Patent Application Laid-open NO. 2002-318376
Patent Document 5:
Japanese Patent Application Laid-open NO. 2002-71978

FIG. 1 illustrates an optical demultiplexer that diverts a WDM signal. A received WDM signal is input to the optical demultiplexer, in which a plurality of asymmetric MZ interferometers (which may be referred to as "AMZs") are cascaded in a tree structure. A WDM signal includes four signal components of wavelengths $\lambda 1$ to $\lambda 4$.

A path length difference in an AMZ 910 a first stage is $2\Delta L$, and each of a path length difference in an AMZ 920 at a second stage and a path length difference in an AMZ 930 a third stage is $\Delta L$. The WDM signal is separated into two transmission components whose spectra are inverted relative to each other, at two output ports of the AMZ 910. The AMZ 910 is designed such that an upper arm transmits light of the wavelength $\lambda 1$ and the wavelength $\lambda 3$ and a lower arm transmits light of the wavelength $\lambda 2$ and the wavelength $\lambda 4$. The separated transmission spectra are input to the second stage AMZ 920 and the third stage AMZ 930, respectively. In each AMZ of the second stage, the inputted spectrum is again separated into two transmission components whose spectra are inverted relative to each other. The period of the transmission spectrum is inversely proportional to the arm length difference. The period of the transmission spectra separated by the second stage AMZ 920 and the third stage AMZ 930 is twice as long as that of the transmission spectra separated by the first stage AMZ 910. With this structure, signals of four wavelengths are separated at and output from the total of four output ports of the second stage AMZ 920 and the third stage AMZ 930.

The spectrum of the light transmitted from the input port to each of the output ports of the optical demultiplexer is determined by the product of the transmission spectra of the AMZs existing between the input port and the output port. By finely tuning the effective arm length difference of each AMZ at the order of the wavelength to bring the peak wavelength of the transmission spectrum to an appropriate wavelength for the input WDM signal, a spectrum from which a light component of a target wavelength can be separated is obtained at the output port.

SUMMARY

According to an aspect of the present embodiment, an optical demultiplexer that separates light including a plurality of wavelengths into light of respective wavelengths, including: optical demultiplexer components each including, N 2×2 couplers where N is 2 or more, and N−1 Asymmetric Mach-Zehnder interferometers each provided with phase shifters, the N−1 Asymmetric Mach-Zehnder interferometers being respectively arranged among the N 2×2 couplers; unit circuits each including three of the optical demultiplexer components having a same structure and being cascaded in a tree structure, wherein the unit circuits are cascaded in the tree structure, in the optical demultiplexer components having the same structure, a combination of arm length differences in waveguide pairs is the same with respect to the N−1 Asymmetric Mach-Zehnder interferometers in which the phase shifters are arranged, and in three of the optical demultiplexer components in at least one of the unit circuits, N is three or more; and control circuits each of which controls the phase shifters arranged in a corresponding optical demultiplexer component of a corresponding unit circuit in order to increase or decrease a value of a function having, as an argument, a power value acquired by a monitor from among monitors arranged at four optical waveguides at an output side of the corresponding unit circuit.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

Figure 1:
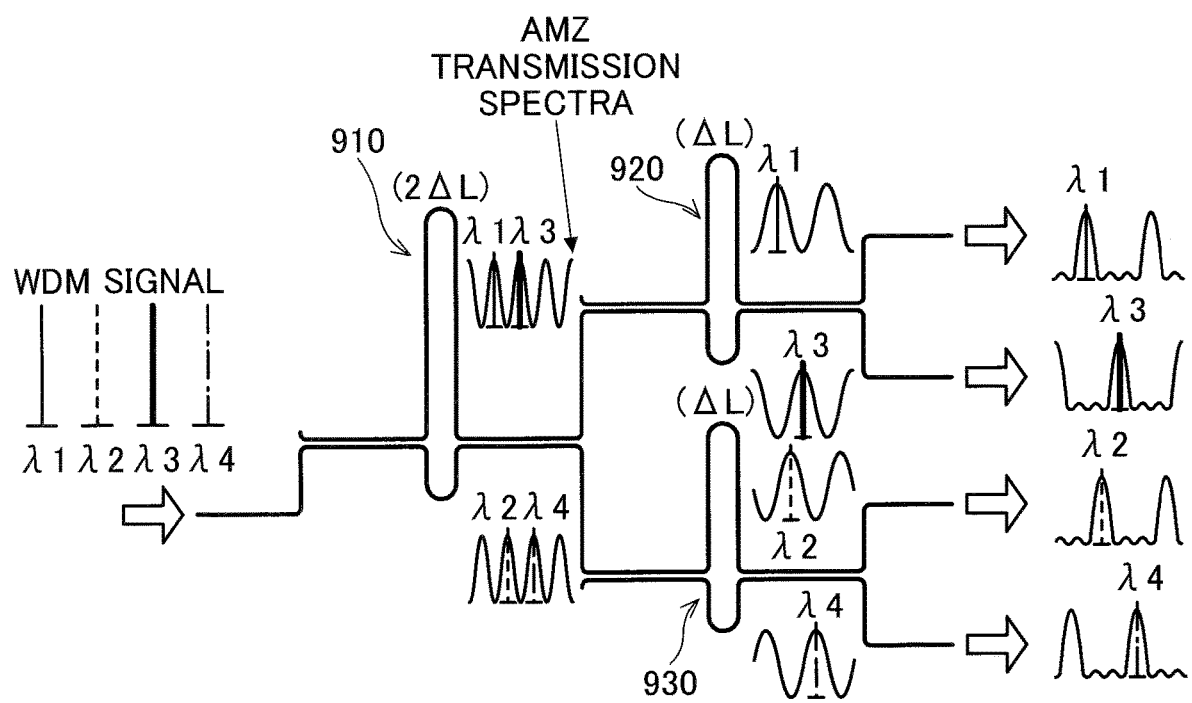
FIG. 1 illustrates an optical demultiplexer that diverts a WDM signal.
Figure 2:
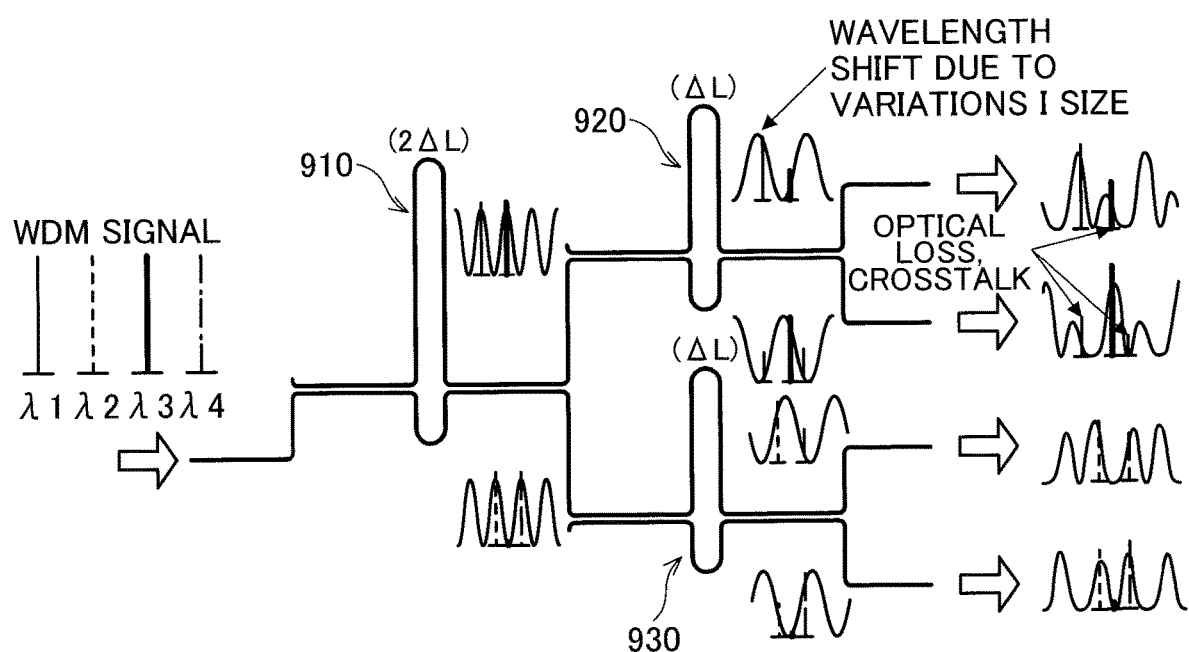
FIG. 2 is a diagram for explaining the optical demultiplexer.

Prior to describing the embodiments in detail, brief explanation is made of with respect to a technical problem in the conventional configuration found by the inventor, with reference to FIG. 2. An arm length difference of an AMZ is influenced by variations in a manufacturing process and a variation in a refractive index due to temperature change, and the arm length difference does not necessarily meet one as designed. Upon fluctuation of the peak transmission wavelength of each AMZ due to variations in the manufacturing process or the refractive index, a transmission spectrum of light deforms at each of output ports, which results in optical loss and crosstalk as illustrated in FIG. 2.

In addition, in each light included in the input WDM signal, a wavelength deviation may also occur, and in this case, a crosstalk occurs.

For this reason, there is a need for an optical demultiplexer capable of separating an optical signal for each wavelength with a low crosstalk even when there is wavelength variation in the optical signal in an incoming WDM signal.

The embodiments provide an optical demultiplexer capable of demultiplexing an optical signal with a low crosstalk, even though there is wavelength variation in the optical signal in the incoming WDM signal.

<Basic Structure>

Embodiments will be described below. Note that components that are the same as components described will be designated by the same reference numerals, and the description thereof will be omitted.

First Embodiment

First, an optical demultiplexer having a structure that solves variation in a transmission peak wavelength of each AMZ due to the manufacturing variation and the refractive index variation will be described.

Figure 3:
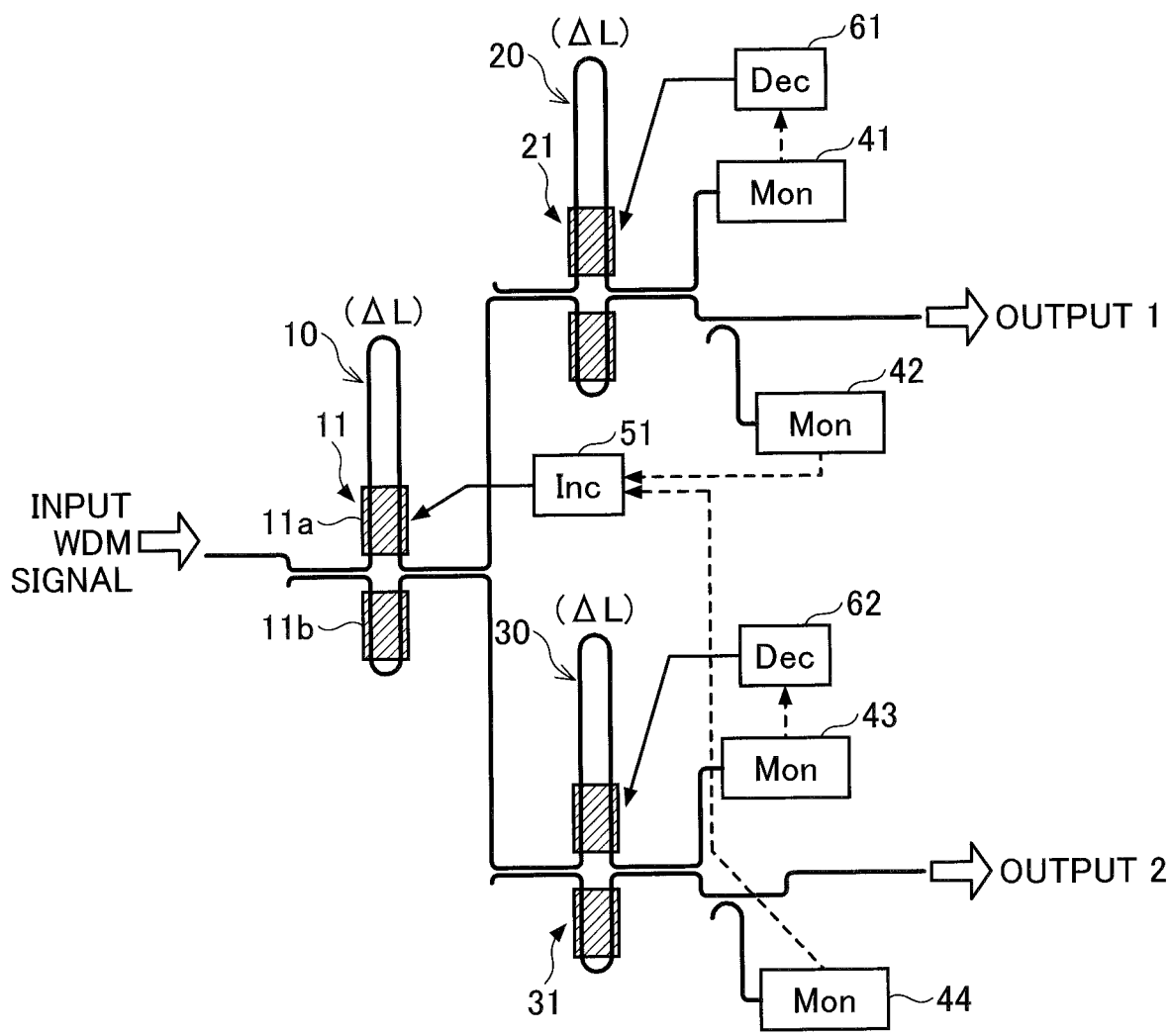
FIG. 3 is a diagram illustrating a configuration of a unit circuit UC (one unit) used in the optical demultiplexer.

FIG. 3 is a diagram illustrating a configuration of a unit circuit UC (one unit) used in the optical demultiplexer. The optical demultiplexer is used in an optical transport apparatus in a wavelength multiplexing method. The unit circuit UC includes three asymmetric Mach-Zehnder interferometers (AMZs) having the same arm length difference $\Delta L$: a first AMZ 10, a second AMZ 20, and a third AMZ 30. That is, the unit circuit UC is a structure AT (AMZ Triplet), in which the AMZ of the same structure is connected in a tree structure, and phase shifters 11, 21, and 31 are controlled to correct a phase variation. In the embodiments, the first AMZ 10, the second AMZ 20, and the third AMZ 30 are collectively referred to as AMZ. In the specification and the claims, when the arm length difference is "the same", it means that a design effective arm length difference is the same. In an actual product, it means that a tolerance, a manufacturing variation, and the like are included.

Each of the first AMZ 10, the second AMZ 20, and the third AMZ 30 includes one input port and two output ports. Each of the two output ports of the first AMZ 10 is connected to an input of the second AMZ 20 and an input of the third AMZ 30.

The unit circuit UC includes a first monitor 41 connected to one of the two output ports of the second AMZ 20, a second monitor 42 connected to another output port, a third monitor 43 connected to one of the two output ports of the third AMZ 30, and a fourth monitor 44 connected to another output port.

An output port on a side where the second monitor 42 of the second AMZ 20 is provided is one of the two output ports of the unit circuits UC outputting "OUTPUT 1", and an output port on another side, on which the fourth monitor 44 of the third AMZ 30 is provided, is another one of the two output ports of the unit circuits UC outputting "OUTPUT 2".

Monitor results of the second monitor 42 and the fourth monitor 44 are input to a control circuit 51. A monitor result of the first monitor 41 is input to a control circuit 61, and a monitor result of the third monitor 43 is input to a control circuit 62.

The control circuit 51 controls a transmission characteristic of the first AMZ 10 based on the monitor results of the second monitor 42 and the fourth monitor 44. The control circuit 61 controls a transmission characteristic of the second AMZ 20 based on the monitor result of the first monitor 41. The control circuit 62 controls a transmission characteristic of the third AMZ 30 based on the monitor result of the third monitor 43.

The control of the transmission characteristic is performed by controlling each of the phase shifters 11, 21, and 31, which are provided in the first AMZ 10, the second AMZ 20, and the third AMZ 30, respectively.

The control circuit 51 controls a phase shifter 11 in a direction, in which power detected by the second monitor 42 and the fourth monitor 44 increases. In FIG. 3, the control circuit 51 is designated "Inc".

The control circuit 61 controls the phase shifter 21 in a direction, in which power detected by the first monitor 41 decreases. Because the control circuit 61 performs reduction control, the control circuit 61 is designated "Dec" in FIG. 3.

The control circuit 62 controls the phase shifter 31 in a direction, in which power detected by the third monitor 43 decreases. In FIG. 3, the control circuit 62 is designated as "Dec".

The unit circuit UC includes, with respect to an input "1", a first output ("OUTPUT 1" in FIG. 3) obtained from the light transmitted through the first AMZ 10 and the second AMZ 20, and a second output ("OUTPUT 2" in FIG. 3) obtained from light transmitted through the first AMZ 10 and the third AMZ 30. The unit circuit UC in FIG. 3 separates two wavelengths; however, more wavelengths are separated by providing a plurality of unit circuits UC and by connecting the plurality of unit circuits UC at multiple stages in a tournament tree structure. In a case in which a number of stages of the unit circuits UC connected to the multiple stages is assumed to be "m" stages, $2^m$ wavelengths are separated.

Figure 4:
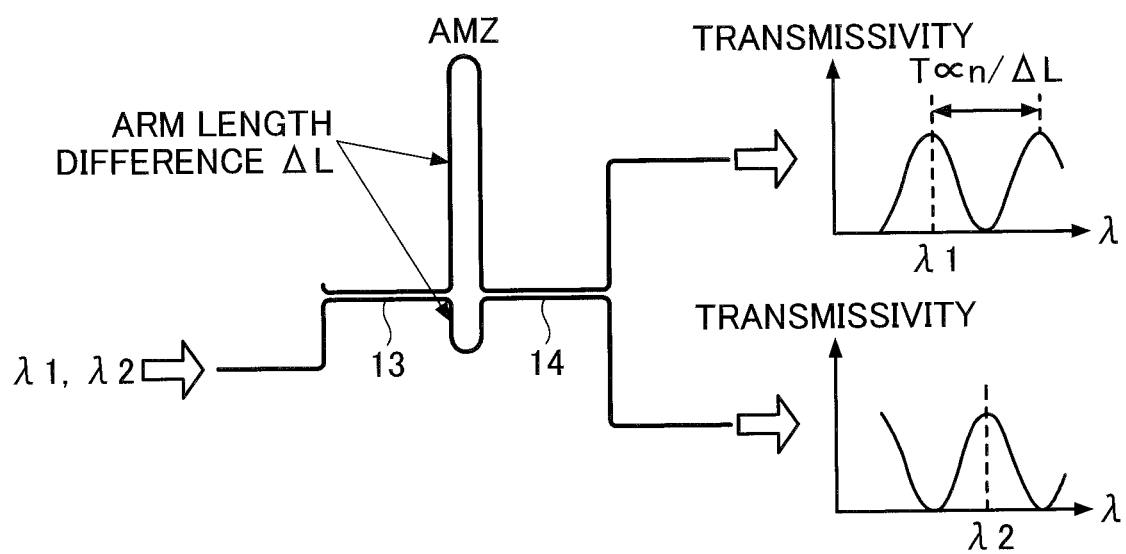
FIG. 4 illustrates an example of an asymmetric Mach-Zehnder interferometer AMZ.

FIG. 4 illustrates an example of an asymmetric Mach-Zehnder interferometer AMZ. The AMZ includes a 3 dB coupler 13 that branches incoming light, two optical waveguides that guide each of the branched light by the 3 dB coupler 13, and a 3 dB coupler 14 that combines the branched light. The arm lengths of the two optical waveguides differ by $\Delta L$.

The transmission spectrum of the AMZ includes a period T inversely proportional to an arm length difference $\Delta L$. More precisely, the transmission spectrum of the AMZ is a spectrum of a laid cosine type of the period T inversely proportional to $\Delta L/n$. Where "n" is a refractive index of a guiding mode.

For example, when a WDM signal having multiplexed light of the wavelength $\lambda 1$ and the wavelength $\lambda 2$ is incident on an AMZ, the wavelength $\lambda 1$ and wavelength $\lambda 2$ are split by the arm length difference of $\Delta L$. When the wavelength $\lambda 1$ and the wavelength $\lambda 2$ coincide with the transmitted center wavelength of the AMZ, the transmitted spectrum including a peak waveform of the wavelength $\lambda 1$ is output from one output port, and the transmitted spectrum including the peak waveform of the wavelength $\lambda 2$ is output from another output port.

As described in FIG. 3, of the two output ports of the second AMZ 20, a first transmission spectrum is output as "OUTPUT 1" from the output port on the side where the second monitor 42 is provided. Thus, the second monitor 42 functions as an output light power monitor.

Among the two output ports of the third AMZ 30, a second transmission spectrum is output as "OUTPUT 2" from the output port on the side where the fourth monitor 44 is provided. Thus, the fourth monitor 44 functions as an output light power monitor.

In a case in which the unit circuit UC of FIG. 3 is connected in the multiple stages, a separate unit circuit is connected to "OUTPUT 1" and "OUTPUT 2" of the unit circuit UC. This multiple stage configuration will be described later.

A principle of the unit circuit UC in FIG. 3 is as follows. For example, an optical signal, in which the wavelength $\lambda 1$ and the wavelength $\lambda 2$ are multiplexed, is input to the unit circuit UC. The input light is transmitted through the first AMZ 10 to obtain two transmission spectra corresponding to the arm length difference.

One of the two transmission spectra is incident on the second AMZ 20 from one of the two output ports of the first AMZ 10, and another transmission spectrum is incident on the third AMZ 30 from the another of the two output ports of the first AMZ 10. The light incident on the second AMZ 20 is separated into two transmission spectra, and "OUTPUT 1" is obtained at one of the two output ports of the second AMZ 20. The wavelength desired to be extracted at "OUTPUT 1" is, for example, the wavelength l; however, it is not necessarily possible to accurately separate only the wavelength $\lambda 1$ by the manufacturing variation, the refractive index variation, or the like. Therefore, the power of the output light appearing in the "OUTPUT 1" is monitored by the second monitor 42, and the monitor result is input to the control circuit 51.

Similarly, although the wavelength $\lambda 2$ desired to be the "OUTPUT 2" in the third AMZ 30 is the wavelength $\lambda 2$, it is not necessarily possible to accurately separate only the wavelength $\lambda 2$. Therefore, the power of the output light appearing at the "OUTPUT 2" is monitored by the fourth monitor 44, and the monitor result is input to the control circuit 51.

The control circuit 51 controls the phase shifter 11 of the first AMZ 10 in a direction, in which the power of the two outputs of the unit circuit UC increases based on the output of the second monitor 42 and the fourth monitor 44. As an example of power increase, by controlling the phase shifter 11, a sum of a monitor light power on the second monitor 42 and a monitor light power on the fourth monitor 44 increases. As another example, a configuration for controlling the direction, in which a value represented by a cubic function of the monitor light power increases may be provided.

The port opposite the "OUTPUT 1" of the second AMZ 20 outputs a component of light that does not transmit to the "OUTPUT 1". This optical component does not contribute to an output of the unit circuit UC. Therefore, this unused component is monitored by the first monitor 41 and a monitor result is input to the control circuit 61. The control circuit 61 controls the phase shifter 21 of the second AMZ 20 in the direction of reducing a component of light that does not contribute to the output to suppress the light loss.

Similarly, on a port opposite the "OUTPUT 2" of the third AMZ 30, a component of the light, which does not pass through to the output 2, is output. This optical component does not contribute to the output of the unit circuit UC. The unused component is then monitored by the third monitor 43 and a monitor result is input to the control circuit 62. The control circuit 62 controls the phase shifter 31 of the third AMZ 30 in the direction of reducing a component of light, which does not contribute to the output to suppress the light loss.

The configuration of FIG. 3 compensates for the variation in the optical waveguide manufacturing of each AMZ and the variation in the refractive index due to a temperature variation, and controls each AMZ to an optimum condition for an incoming signal wavelength. By increasing a light output including a wavelength of a target and reducing a wasted light component, light loss and crosstalk are reduced, and high-precision wavelength separation is realized.

Figure 5:
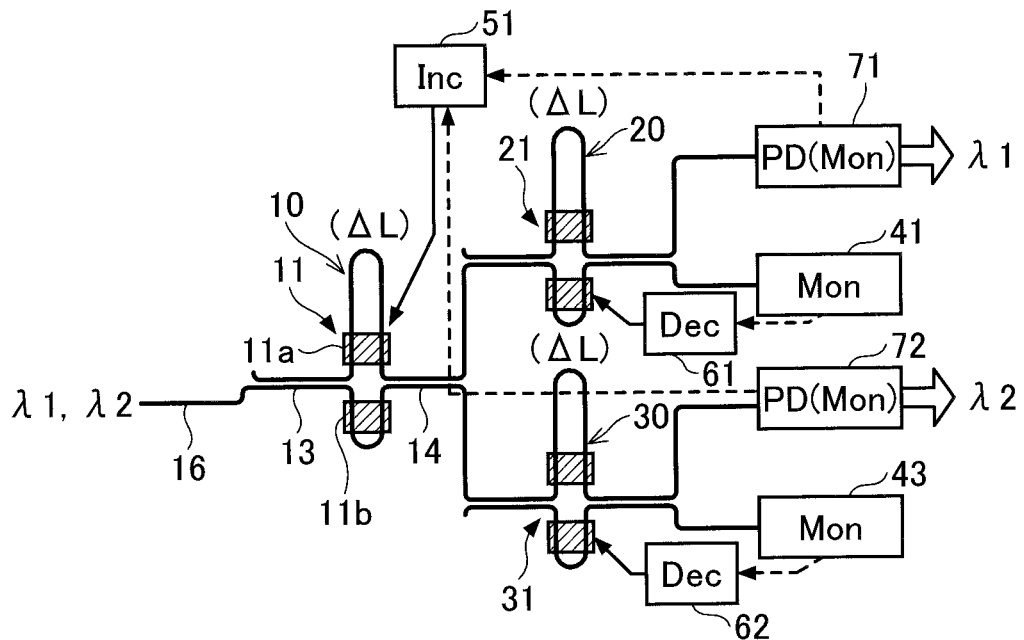
FIG. 5 is a schematic diagram of an optical demultiplexer 91 using the unit circuit UC depicted in FIG. 3.

FIG. 5 is a schematic diagram of an optical demultiplexer 91 using the unit circuit UC depicted in FIG. 3. The optical demultiplexer 91 performs a wavelength separation of a dual-wavelength WDM signal with a minimum configuration using one (one unit) of the unit circuits UC depicted in FIG. 3. The optical demultiplexer 91 has three asymmetric Mach-Zehnder interferometers: the first AMZ 10, the second AMZ 20, and the third AMZ 30, which are connected in a tree structure. The first AMZ 10, the second AMZ 20, and the third AMZ 30 have the same arm length difference $\Delta L$.

In a case in which the optical demultiplexer 91 is implemented on a silicon (Si) integrated circuit, a core of the input waveguide 16 and the optical waveguide forming each AMZ are formed, for example, of Si, and a clad is formed of $SiO_2$. The optical waveguide is not limited to the Si core and the $SiO_2$ clad, and any material capable of confining light to the core may be combined. For example, an optical waveguide may be formed on a quartz substrate with quartz glass, transparent resin, or the like.

In FIG. 5, a light directional coupler is used as the 3 dB couplers 13 and 14 on the input and output sides of the AMZ. However, this example is not limited thereto, and any other suitable multiplexing/demultiplexing configuration such as multi-mode interference (MMI) optical waveguide may be employed.

The phase shifters 11, 21, and 31 provided in each AMZ include, for example, a component 11a provided to an upper arm and a component 11b provided to a lower arm. The phase shifters 11, 21, and 31 may be formed of a thin film of an electrical resistor such as tungsten (W), titanium (Ti), platinum (Pt), nickel (Ni), or the like. Electric current is passed through an electrical resistor to vary temperature of each optical waveguide with heat generated, and the refractive index is changed to control the optical phase.

Figure 6:
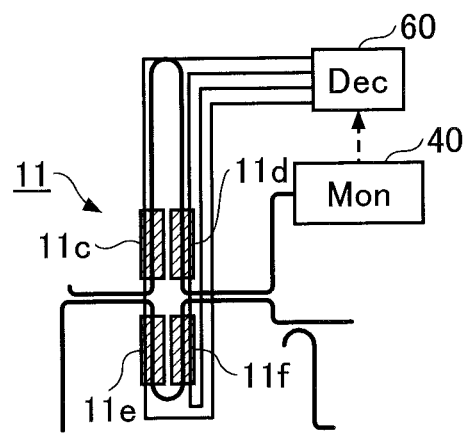
FIG. 6 illustrates an example of a phase shifter.

FIG. 6 illustrates an example of the phase shifter 11. Thin films 11c and 11d of the resistor body are disposed along the optical waveguide of the upper arm of the AMZ, and thin films 11e and 11f of the resistor body are disposed along the optical waveguide of the lower arm. Thin films 11c and 11e of the electrical resistor are connected in series to terminals of a control circuit 60, and thin films 11d and 11f of an electrical resistor are connected in series to terminals of the control circuit 60. A signal obtained in a monitor 40 is input to the control circuit 60 and the phase shifter 11 is controlled by a control signal output from the control circuit 60.

A configuration of the phase shifter 11 is not limited to the configuration depicted in FIG. 6; however, a configuration (carrier plasma effect) may be used that electrically changes the refractive index by increasing and decreasing a carrier density in the optical waveguide, or another configuration may be used that utilizes the electro-optic effect. The same applies to the phase shifters 21 and 31.

As depicted in FIG. 5, the incident WDM signal is separated into two transmission spectra through the first AMZ 10 with the spectrum inverted. One transmission spectrum enters the second AMZ 20, and the other transmission spectrum enters the third AMZ 30.

A first output light is extracted from a photodiode (PD) 71 connected to one of the two output ports of the second AMZ 20, and a second output light is extracted from a photodiode (PD) 72 connected to one of the two output ports of the third AMZ 30.

Incidentally, a component labelled as "Mon" in the drawings is a power monitor by a photodiode or the like, and a component labelled as "PD(Mon)" is a high-speed photodiode for converting a high-speed optical signal, which also serves as a power monitor, into an electrical signal.

PD 71 and PD 72 also function as output light power monitors, and monitor results are input to the control circuit 51. The control circuit 51 controls the phase shifter 11 in a direction, in which the optical power detected in the PD 71 and the PD 72 increases.

The direction of control may be determined, for example, by changing electric current injected into the phase shifter 11 in one direction with a predetermined step size at a start of control and observing a direction of changes in output power of the PD 71 and the PD 72.

At another output port of the second AMZ 20, components not transmitted to the PD 71 are monitored by the first monitor 41 and monitor results are input to the control circuit 61. The control circuit 61 controls the phase shifter 21 to reduce the monitor results of the first monitor 41.

At the other output port of the second AMZ 20, the components not transmitted to the PD 72 are monitored by the third monitor 43 and the monitor results are input to the control circuit 62. The control circuit 62 controls the phase shifter 31 to reduce the monitor results of the third monitor 43.

By controlling the phase shifters 11 to 31 as described above by the control circuit 51 and the control circuits 61 and 62, it is possible to optimally set the transmission characteristics of the first AMZ 10, the second AMZ 20, and the third AMZ 30 for the incoming WDM signal.

Figure 7:
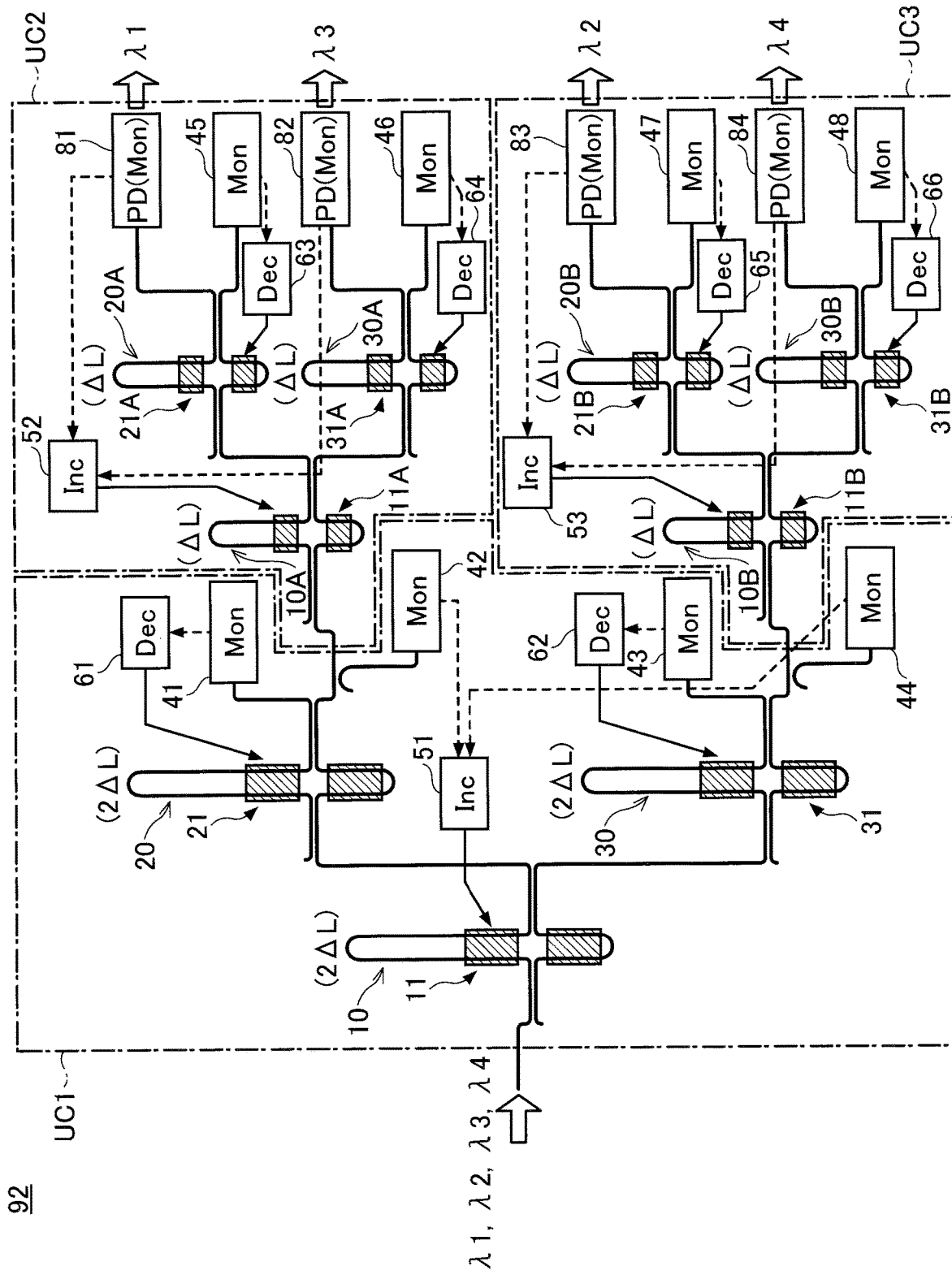
FIG. 7 illustrates an optical demultiplexer 92, in which three unit circuits UC depicted in FIG. 3 are connected in multiple stages in a tree structure.

FIG. 7 illustrates an optical demultiplexer 92, in which three unit circuits UC depicted in FIG. 3 are connected in multiple stages in the tree structure. A second unit circuit UC2 and a third unit circuit UC3 are respectively connected to two output ports of a first unit circuit UC1 in the optical demultiplexer 92.

An arm length difference of each AMZ of the first unit circuit UC1 is set to $2\Delta L$. An arm length difference of each AMZ of the second unit circuit UC2 and the third unit circuit UC3 is set to $\Delta L$. In a case in which the arm length difference $\Delta Lm$ of the AMZ used in the unit circuit of an m-th stage of the unit circuit UC connected to the multi-stage is assumed, $\Delta Lm = \Delta Lm - \frac{1}{2}$ is represented.

The optical demultiplexer 92 includes a total of four output ports of two output ports of the second unit circuit UC2 and two output ports of the third unit circuit UC3, and separates each wavelength of the WDM signal, in which four wavelengths are multiplexed from the wavelength $\lambda 1$ to the wavelength $\lambda 4$.

A spacing between the wavelengths separated is determined by the arm length difference, and a period of the transmission spectrum of the second unit circuits UC2 and third unit circuit UC3 is twice a period of the transmission spectrum of the first unit circuit UC1.

The circuit configuration of the first unit circuit UC1 is the same as that of the unit circuit UC described with reference to FIG. 3. The second unit circuit UC2 and the third unit circuit UC3 have a similar circuit configuration to that of the optical demultiplexer 91 depicted in FIG. 5.

The second unit circuit UC2 includes three asymmetric Mach-Zehnder interferometers connected in a tree structure: a first AMZ 10A, a second AMZ 20A, and a third AMZ 30A.

The first AMZ 10A, the second AMZ 20A, and the third AMZ 30A are provided with phase shifters 11A, 21A, and 31A, respectively.

A PD 81 for detecting the first output light is connected to one output of the second AMZ 20A. The PD 81 outputs light of the wavelength λ1 from the optical demultiplexer 92 and inputs a power monitor result of the output light to the control circuit 52. A monitor 45 is provided at another output of the second AMZ 20A, and a monitor result is input to a control circuit 63.

A PD 82 for detecting the second output light is connected to one of outputs of the third AMZ 30A. The PD 82 outputs light of the wavelength λ3 from the optical demultiplexer 92 and inputs a power monitor result of an output light to control circuit 52. A monitor 46 is provided at the other output of the third AMZ 30A and the monitor results are input to a control circuit 64.

The control circuit 52 controls the phase shifter 11A in a direction, in which the sum of output power of the PD 81 and output power of the PD 82 increases.

The control circuit 63 controls the phase shifter 21A such that the monitor results of the monitor 45 are reduced. The control circuit 64 controls the phase shifter 31A such that the monitor results of the monitor 46 are reduced.

The third unit circuit UC3 includes three asymmetric Mach-Zehnder interferometers connected in a tree structure: a first AMZ 10B, a second AMZ 20B, and a third AMZ 30B. The first AMZ 10B, the second AMZ 20B, and the third AMZ 30B are provided with phase shifters 11B, 21B, and 31B, respectively.

A PD 83 for detecting a third output light is connected to one output of the second AMZ 20B. The PD 83 outputs light of the wavelength λ2 from the optical demultiplexer 92, and inputs a light power monitor result of output light into a control circuit 53. A monitor 47 is provided at another output of the second AMZ 20B, and a monitor result is input to a control circuit 65.

A PD 84 is connected to one of outputs of the third AMZ 30B to detect the fourth output light. The PD 84 outputs light of the wavelength λ4 from the optical demultiplexer 92, and inputs a power monitor result of output light into the control circuit 53. A monitor 48 is provided at another output of the third AMZ 30A, and a monitor result is input to a control circuit 66.

The control circuit 53 controls the phase shifter 11B in a direction, in which a sum of output power of the PD 83 and output power of the PD 84 increases.

The control circuit 65 controls the phase shifter 21B to reduce a monitor result of the monitor 47. The control circuit 66 controls the phase shifter 31B to reduce the monitor results of the monitor 48.

An operation of the optical demultiplexer 92 is as follows. In a case in which a WDM signal including wavelengths from the wavelength λ1 to the wavelength λ4 is input to the optical demultiplexer 92, the first unit circuit UC1 is separated into the first transmission spectrum and the second transmission spectrum.

The first transmission spectrum is determined by a product of the transmission spectra of the first AMZ 10 and the second AMZ 20 having the same arm length difference 2ΔL. The first transmission spectrum is input to the second unit circuit UC2. The second transmission spectrum is determined by a product of the transmission spectra of the first AMZ 10 and the third AMZ 30 having the same arm length difference 2ΔL. The second transmission spectrum is input to the third unit circuit UC3.

Ideally, the first transmission spectrum includes peak waveforms of the wavelength λ1 and the wavelength λ3, and the second transmission spectrum includes peak waveforms of the wavelength λ2 and the wavelength λ4. However, under a condition before control, the transmission spectrum does not necessarily contain only a desired wavelength due to an influence of manufacturing variations.

In a case in which the control begins, the control circuit 51 controls the phase shifter 11 in a direction that increases power of a desired output light spectrum, and the control circuits 61 and 62 control the phase shifters 21 and 31 in a direction that decreases unused spectral components. Therefore, light loss, crosstalk, and the like are controlled in the two transmission spectra output from the first unit circuit UC1.

In the second unit circuit UC2, the input first transmission spectrum is further separated into two transmission spectra by the first AMZ 10A. The three AMZs of the second unit circuit UC2 have an arm length difference, which is half the arm length difference of the AMZ of the first unit circuit UC1. The transmission spectrum separated by the first AMZ 10A is twice a period of an input transmission spectrum.

One of the separated transmission spectra is transmitted through the second AMZ 20A and is detected by the PD 81 connected to one of the output ports of the second AMZ 20A. Another one of the separated transmission spectra is transmitted through the third AMZ 30A and is detected by the PD 82 connected to one of the output ports of the third AMZ 30A.

The control circuit 52 controls a direction in order to increase output power of the PD 81 and output power of the PD 82, and the control circuits 63 and 64 reduce light components, which do not contribute to the outputs. With this configuration, an optical signal of the wavelength λ1 is output from the PD 81, and an optical signal of the wavelength λ3 is output from the PD 82.

The third unit circuit UC3 performs the same operation, and an optical signal of the wavelength λ2 is output from the PD 83, and an optical signal of the wavelength λ4 is output from the PD 84.

By controlling an increase in power in the control circuit 51, it is possible to maximize the power of the transmission spectrum output to the second unit circuit UC2 and the third unit circuit UC3 at a later stage. The control circuits 52 and 53 provide power increase control to maximize power of light at each wavelength output from the PD 81 through the PD 84.

The control circuits 61-66 control the direction, in which the predetermined monitor output is reduced, in order to minimize optical components that do not contribute to the output of the optical demultiplexer 92.

After a certain period of time, when the monitor light power is stabilized, the heater power is also stabilized.

A correction is performed autonomously by control based on the monitor results using the control circuits 51-53 for a power increase and the control circuits 61-66 for a power decrease.

It is possible for the optical demultiplexer 92 to accurately separate light of each wavelength by compensating for manufacturing variation of the optical path length difference of the AMZ variation in the refractive index of the AMZ.

As described above, the optical demultiplexer 92 is a structure CAT (Cascaded ATs) with an AT connected in the tree structure and is represented by the arm length difference $\Delta L=\lambda_0^2/4n_G\Delta\lambda$ of the AMZ in a final stage. In a case in which $\lambda_0$ is the center wavelength of the WDM signal, $\Delta\lambda$ is the WDM wavelength interval, and $n_G$ is a group refractive index of an arm of the AMZ. As the stage shifts to an incident side of a WDM signal, the arm length difference of ΔT doubles.

In the optical demultiplexer 92, it is possible to accurately separate light of each wavelength by compensating for the manufacturing variation of the optical path length difference and the variation in the refractive index of the AMZ. However, in a case in which the variation in the wavelength of an incoming WDM signal is large, the crosstalk is not sufficiently reduced. For example, crosstalk increases for a case in which a wavelength deviation of 6.5 nm is tolerated for a wavelength interval of 20 nm such as Coarse WDM.

For this reason, there is a need for an optical demultiplexer that separates with a low crosstalk even if an optical signal in an incoming WDM signal varies in wavelength.

(Optical Demultiplexer)

Figure 8:
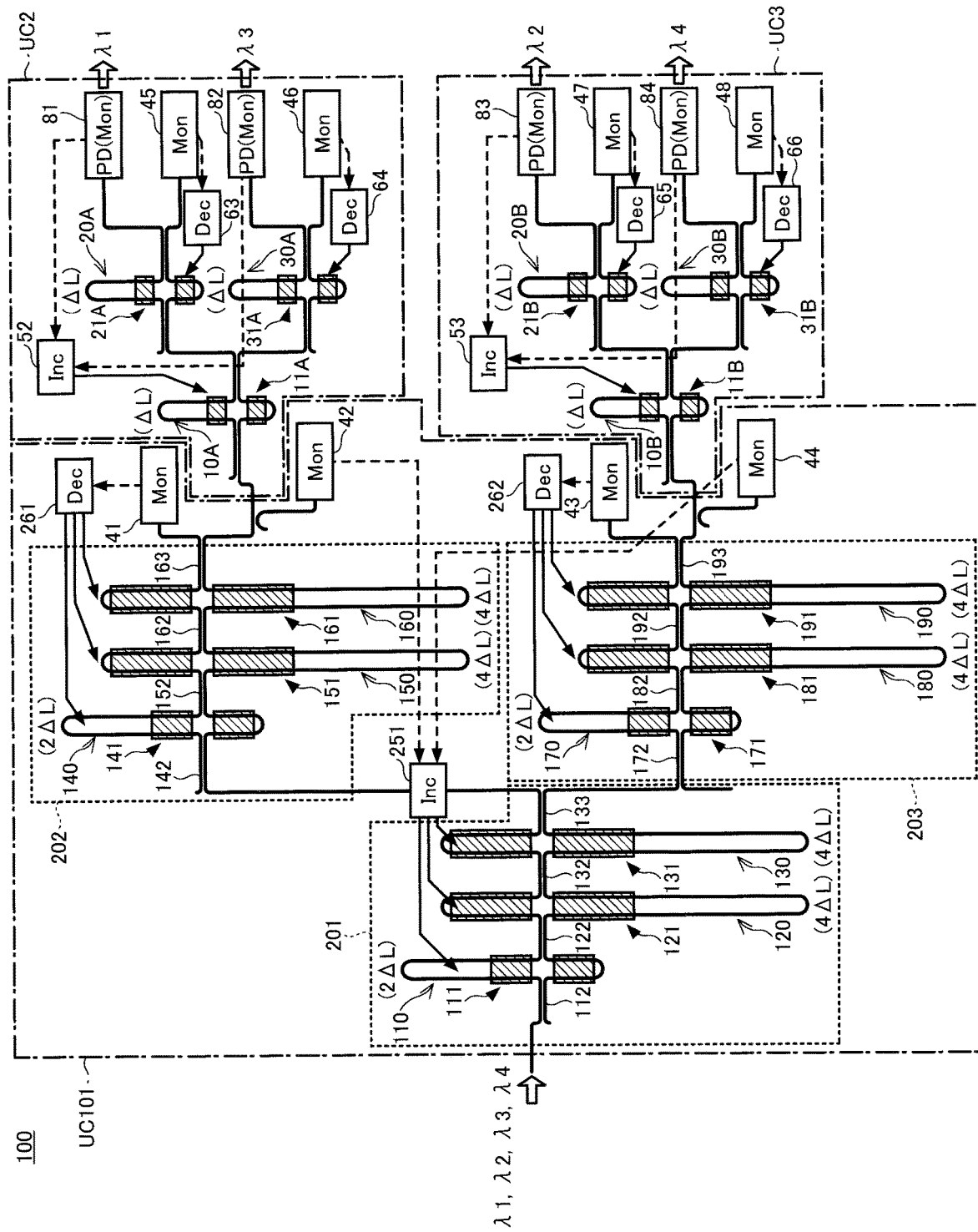
FIG. 8 is a diagram illustrating an optical demultiplexer in a first embodiment.

Next, an optical demultiplexer according to the first embodiment will be described. As depicted in FIG. 8, an optical demultiplexer 100 in the first embodiment is connected to multiple stages formed in a tree structure. Specifically, the second unit circuit UC2 and the third unit circuit UC3 are respectively connected to two output ports of a first unit circuit UC101.

The optical demultiplexer 100 has a total of four output ports of two output ports of the second unit circuit UC2 and two output ports of the third unit circuit UC3, each wavelength of the WDM signal being multiplexed from the wavelength λ1 to the wavelength λ4. A distance between wavelengths to be separated is determined by an arm length difference. The arm length difference of each AMZ of the second unit circuit UC2 and the third unit circuit UC3 is set to ΔL.

The first unit circuit UC101 is provided with nine asymmetric Mach-Zehnder interferometers. Specifically, an AMZ 110, an AMZ 120, an AMZ 130, an AMZ 140, an AMZ 150, an AMZ 160, an AMZ 170, an AMZ 180, and an AMZ 190 are provided.

The AMZ 110 includes a phase shifter 111 with an arm length difference of 2ΔL, two input ports, and two output ports. The AMZ 120 includes a phase shifter 121 with an arm length difference of 4ΔL, two input ports, and two output ports. The AMZ 130 includes a phase shifter 131 with an arm length difference of 4ΔL, two input ports, and two output ports.

A 2×2 coupler 112 is provided at an earlier stage with respect to the AMZ 110, a 2×2 coupler 122 is provided between the AMZ 110 and the AMZ 120, and a 2×2 coupler 132 is provided between the AMZ 120 and the AMZ 130. A 2×2 coupler 133 is provided at a later stage with respect to the AMZ 130.

That is, the AMZ 110 is provided between the 2×2 coupler 112 and the 2×2 coupler 122, the AMZ 120 is provided between the 2×2 coupler 122 and the 2×2 coupler 132, and the AMZ 130 is provided between the 2×2 coupler 132 and the 2×2 coupler 133. Therefore, a WDM signal incident on the optical demultiplexer 100 propagates in an order of the 2×2 coupler 112, the AMZ 110, the 2×2 coupler 122, the AMZ 120, the 2×2 coupler 132, the AMZ 130, and the 2×2 coupler 133. In the present application, a section, in which the 2×2 coupler 112, the AMZ 110, the 2×2 coupler 122, the AMZ 120, the 2×2 coupler 132, the AMZ 130, and the 2×2 coupler 133 are formed, may be referred to as a first AMZ (Asymmetric Mach-Zehnder interferometer) optical demultiplexer component 201.

The AMZ 140 includes a phase shifter 141 with an arm length difference of 2ΔL, two input ports, and two output ports. The AMZ 150 includes a phase shifter 151 with an arm length difference of 4ΔL, two input ports, and two output ports. The AMZ 160 includes a phase shifter 161 with an arm length difference of 4ΔL, two input ports, and two output ports.

A 2×2 coupler 142 is provided at an earlier stage with respect to the AMZ 140, a 2×2 coupler 152 is provided between the AMZ 140 and the AMZ 150, and a 2×2 coupler 162 is provided between the AMZ 150 and the AMZ 160. A 2×2 coupler 163 is provided at a later stage with respect to the AMZ 160.

That is, the AMZ 140 is provided between the 2×2 coupler 142 and the 2×2 coupler 152, the AMZ 150 is provided between the 2×2 coupler 152 and the 2×2 coupler 162, and the AMZ 160 is provided between the 2×2 coupler 162 and the 2×2 coupler 163. Therefore, a WDM signal incident on the 2×2 coupler 142 propagates in an order of the AMZ 140, the 2×2 coupler 152, the AMZ 150, the 2×2 coupler 162, the AMZ 160, and the 2×2 coupler 163. In this application, a section, in which the 2×2 coupler 142, the AMZ 140, the 2×2 coupler 152, the AMZ 150, the 2×2 coupler 162, the AMZ 160, and the 2×2 coupler 163 are formed, may be referred to as a second AMZ optical demultiplexer component 202.

The AMZ 170 includes a phase shifter 171 with an arm length difference of 2ΔL, two input ports, and two output ports. The AMZ 180 includes a phase shifter 181 with an arm length difference of 4ΔL, two input, and two output ports. The AMZ 190 includes a phase shifter 191 with an arm length difference of 4ΔL, two input ports, and two output ports.

A 2×2 coupler 172 is provided at an earlier stage with respect to the AMZ 170, a 2×2 coupler 182 is provided between the AMZ 170 and the AMZ 180, and a 2×2 coupler 192 is provided between the AMZ 180 and the AMZ 190. A 2×2 coupler 193 is provided at a later stage with respect to the AMZ 190.

That is, the AMZ 170 is provided between the 2×2 coupler 172 and the 2×2 coupler 182, the AMZ 180 is provided between the 2×2 coupler 182 and the 2×2 coupler 192, and the AMZ 190 is provided between the 2×2 coupler 192 and the 2×2 coupler 193. Therefore, a WDM signal incident on the 2×2 coupler 172 propagates in an order of the AMZ 170, the 2×2 coupler 182, the AMZ 180, the 2×2 coupler 192, the AMZ 190, and the 2×2 coupler 193. In the present application, the section, in which the 2×2 coupler 172, the AMZ 170, the 2×2 coupler 182, the AMZ 180, the 2×2 coupler 192, the AMZ 190, and the 2×2 coupler 193 are formed, may be referred to as a third AMZ optical demultiplexer component 203.

Therefore, in an optical demultiplexer according to the first embodiment, the first AMZ optical demultiplexer component 201, the second AMZ optical demultiplexer component 202, and the third AMZ optical demultiplexer component 203 include an AMZ having an arm length difference of 2ΔL, and an AMZ having an arm length difference of 4ΔL.

Each of two output ports of the AMZ 130 for an output of the first AMZ optical demultiplexer component 201 is connected to an input of the AMZ 140 of the second AMZ optical demultiplexer component 202 and to an input of the AMZ 170 of the third AMZ optical demultiplexer component 203 through the 2×2 coupler 133. In the first AMZ optical demultiplexer component 201, a period of the transmission spectrum of the AMZ 110 is twice each period of transmission spectra of the AMZ 120 and the AMZ 130. That is, each period of the transmission spectra of the AMZ 120 and the AMZ 130 corresponds to ½ the period of the transmission spectrum of the AMZ 110. The period of the transmitted spectrum of the AMZ 110 corresponds to ½ the period of the transmitted spectrum such as the AMZ 10A and the AMZ 10B in the second unit circuit UC2 and the third unit circuit UC3.

In the first embodiment, it is possible to reduce the crosstalk by providing the first AMZ optical demultiplexer component 201 with the AMZ 120 and the AMZ 130 each having the period of the transmission spectrum of half the period of the transmission spectrum of the AMZ 110. Note that each of the second AMZ optical demultiplexer component 202 and the third AMZ optical demultiplexer component 203 brings a similar advantage.

The unit circuit UC101 includes a first monitor 41 connected to one of two output ports of the AMZ 160 of the second AMZ optical demultiplexer component 202, and a second monitor 42 connected to another one of two output ports of the AMZ 160 of the second AMZ optical demultiplexer component 202. The unit circuit UC101 includes the third monitor 43 connected to one of the two output ports of the AMZ 190 of the third AMZ optical demultiplexer component 203 and the fourth monitor 44 provided on another output port of the AMZ 190 of the third AMZ optical demultiplexer component 203.

The output port of the second monitor 42 of the AMZ optical demultiplexer component 202 is one of the output ports of the unit circuit UC101. Another output port of the unit circuit UC101 is an output port at which the fourth monitor 44 of the AMZ 190 of the third AMZ optical demultiplexer component 203 is provided.

Monitor results of the second monitor 42 and the fourth monitor 44 are input to a control circuit 251. A monitor result of the first monitor 41 is input to a control circuit 261 and a monitor result of the third monitor 43 is input to a control circuit 262. In the present application, the control circuit 261 is referred to as a second control circuit and the control circuit 262 is referred to as a third control circuit.

The control circuit 251 controls the transmission characteristics of the AMZ 110, the AMZ 120, and the AMZ 130 of the first AMZ optical demultiplexer component 201 based on the monitor results of the second monitor 42 and the fourth monitor 44. The control circuit 261 controls the transmission characteristics of the AMZ 140, the AMZ 150, and the AMZ 160 of the second AMZ optical demultiplexer component 202 based on the monitor result of the first monitor 41. The control circuit 262 controls the transmission characteristics of the AMZ 170, the AMZ 180, and the AMZ 190 of the third AMZ optical demultiplexer component 203 based on the monitor result of the third monitor 43.

The transmission characteristic of the first AMZ optical demultiplexer component 201 is controlled by controlling the phase shifters 111, 121, and 131 provided in the AMZ 110, the AMZ 120, and the AMZ 130, respectively.

The transmission characteristic of the second AMZ optical demultiplexer component 202 is controlled by controlling the phase shifters 141, 151, and 161 provided in the AMZ 140, the AMZ 150, and the AMZ 160, respectively.

The transmission characteristic of the third AMZ optical demultiplexer component 203 is controlled by controlling the phase shifters 171, 181, and 191 provided in the AMZ 170, the AMZ 180, and the AMZ 190, respectively.

The control circuit 251 controls the phase shifters 111, 121, and 131 in a direction, in which power detected by the second monitor 42 and the fourth monitor 44 increases. In FIG. 8, the control circuit 251 is labelled as "Inc". In the present application, the control circuit 251 may be referred to as a first control circuit.

The control circuit 261 controls the phase shifters 141, 151, and 161 in a direction, in which the power detected by the first monitor 41 decreases. The control circuit 261 performs reduction control and is labelled as "Dec" in the FIG. 8.

The control circuit 262 controls the phase shifters 171, 181, and 191 in a direction, in which power detected by the third monitor 43 decreases. In the figure, control circuit 262 is labelled as "Dec".

The unit circuit UC101 includes a first output obtained from light transmitted through the first AMZ 110 and the second AMZ 120 and a second output obtained from light transmitted through the first AMZ 110 and the third AMZ 130 for one input. The unit circuit UC101 separates two wavelengths. It is also possible to separate more wavelengths by cascading a plurality of unit circuits UC101 in a multi-stage tournament tree. When the number of stages, such as the unit circuits UC101 and UC2 cascaded in multiple stages, is "m", it is possible to separate $2^m$ wavelengths.

When the optical demultiplexer 100 in the first embodiment is implemented on a silicon (Si) integrated circuit, a core of an input waveguide and a core of an optical waveguide forming each AMZ are formed, for example, by Si, and a clad is formed by $SiO_2$. The optical waveguide is not limited to an Si core and an $SiO_2$ clad, and any material capable of confining light to each core may be combined. For example, an optical waveguide may be formed on a quartz substrate with quartz glass, transparent resin, or the like.

The optical demultiplexer 100 according to the first embodiment may use a multimode interference waveguide or other combined wave configuration, instead of a 2×2 coupler.

Phase shifters 111, 121, 131, 141, 151, 161, 171, 181, and 191 provided in each AMZ include, for example, a component provided in an upper arm and a component provided in a lower arm. The phase shifters 111, 121, 131, 141, 151, 161, 171, 181, and 191 are formed of a TiN film or the like. It is possible to change the refractive index of the optical waveguide by changing due to heat generated by electric current passing through the TiN film. The phase shifters 111, 121, 131, 141, 151, 161, 171, 181, and 191 may be formed of a thin film of an electrical resistor such as tungsten, titanium, platinum, nickel, or the like.

The structures of phase shifters 111, 121, 131, 141, 151, 161, 171, 181, and 191 are similar in structure to, for example, the phase shifter 11 depicted in FIG. 6. The phase shifters 111, 121, 131, 141, 151, 161, 171, 181, and 191 are not limited to electric resistors. The structures of phase shifters 111, 121, 131, 141, 151, 161, 171, 181, and 191 may have a function of changing the refractive index of the optical waveguide. For example, a PN junction may be formed in the optical waveguide and the refractive index may be varied by applying a forward or reverse bias, and a polymer having an electro-optic effect may be formed around the optical waveguide.

As depicted in FIG. 8, an incoming WDM signal is separated into two transmission spectra with a spectrum inverted through the first AMZ optical demultiplexer component 201. One of the transmission spectra is incident on the second AMZ optical demultiplexer component 202, and another transmission spectrum is incident on the third AMZ optical demultiplexer component 203.

A first output light is extracted from the second monitor 42, which is connected to one of the two output ports of the AMZ 160 of the second AMZ optical demultiplexer component 202. A second output light is extracted from the fourth monitor 44 connected to one of the two output ports of the AMZ 170 of the third AMZ optical demultiplexer component 203.

Monitor results obtained by the second monitor 42 and the fourth monitor 44 are input to the control circuit 251. The control circuit 251 controls the phase shifters 111, 121, and 131 in a direction, in which optical power detected by the second monitor 42 and the fourth monitor 44 increases.

A direction of control is determined, for example, by changing electric current injected into the phase shifters 111, 121, and 131 in one direction at a predetermined step size at a start of control and observing a direction of a change in output power of the second monitor 42 and the fourth monitor 44.

At another output port of the AMZ 160 of the second AMZ optical demultiplexer component 202, a component not transmitted to the second monitor 42 side is monitored by the first monitor 41, and a monitor result is input to the control circuit 261. The control circuit 261 controls the phase shifters 141, 151, and 161 such that the monitor result of the first monitor 41 is reduced.

At another output port of the AMZ 170 of the third AMZ optical demultiplexer component 203, a component not transmitted to the fourth monitor 44 side is monitored by the third monitor 43, and a monitor result is input to the control circuit 262. The control circuit 262 controls the phase shifters 171, 181, and 191 such that a monitor result of the third monitor 43 is reduced.

The control circuit 251 and the control circuits 261 and 262 control phase shifters 111-191 as described above. Therefore, it is possible to optimally set transmission characteristics of the first AMZ optical demultiplexer component 201, the second AMZ optical demultiplexer component 202, and the third AMZ optical demultiplexer component 203 for the incident WDM signal.

The second unit circuit UC2 includes three asymmetric Mach-Zehnder interferometers connected in a tree structure: a first AMZ 10A, a second AMZ 20A, and a third AMZ 30A. The first AMZ 10A, the second AMZ 20A, and the third AMZ 30A are provided with phase shifters 11A, 21A, and 31A, respectively.

The PD 81 for detecting the first output light is connected to one output of the second AMZ 20A. The PD 81 outputs light of the wavelength $\lambda 1$ from the optical demultiplexer 100, and inputs the power monitor result of this output light to the control circuit 52. The monitor 45 is provided at another output of the second AMZ 20A and a monitor result is input to the control circuit 63.

The PD 82 for detecting the second output light is connected to one of the outputs of the third AMZ 30A. The PD 82 outputs light of the wavelength $\lambda 3$ from the optical demultiplexer 100 and inputs an output light power monitor result into the control circuit 52. The monitor 46 is provided at the other output of the third AMZ 30A and the monitor results are input to the control circuit 64.

The control circuit 52 controls the phase shifter 11A in a direction in which a sum of an output power of the PD 81 and an output power of the PD 82 increases.

The control circuit 63 controls the phase shifter 21A, and thus, a monitor result of the monitor 45 indicates a reduction. The control circuit 64 controls the phase shifter 31A, and thus, the monitor results of the monitor 46 are reduced.

The third unit circuit UC3 includes three asymmetric Mach-Zehnder interferometers connected in a tree structure: a first AMZ 10B, a second AMZ 20B, and a third AMZ 30B.

The first AMZ 10B, the second AMZ 20B, and the third AMZ 30B are provided with the phase shifters 11B, 21B, and 31B, respectively.

The PD 83 for detecting a third output light is connected to one output of the second AMZ 20B. The PD 83 outputs light of the wavelength $\lambda 2$ from the optical demultiplexer 100, and inputs the output light power monitor result into the control circuit 53. The monitor 47 is provided at another output of the second AMZ 20B and a monitor result is input to the control circuit 65.

The PD 84 is connected to one of the outputs of the third AMZ 30B to detect the fourth output light. The PD 84 outputs light of the wavelength $\lambda 4$ from the optical demultiplexer 100, and inputs an output light power monitor result into the control circuit 53. The monitor 48 is provided at another output of the third AMZ 30A, and a monitor result is input to the control circuit 66.

The control circuit 53 controls the phase shifter 11B in a direction, in which a sum of output power of the PD 83 and output power of the PD 84 increases.

The control circuit 65 controls the phase shifter 21B, and thus, a monitor result of the monitor 47 indicates a reduction. The control circuit 66 controls the phase shifter 31B, and thus, a monitor result of the monitor 48 indicates a reduction.

An operation of the optical demultiplexer 100 is conducted as follows. In a case in which a WDM signal having a wavelength from the wavelength $\lambda 1$ to the wavelength $\lambda 4$ is input to the optical demultiplexer 100, the WDM signal is separated at the first unit circuit UC101 into the first transmission spectrum and the second transmission spectrum.

The first transmission spectrum is determined by a product of the transmission spectrum of the first AMZ optical demultiplexer component 201 and the transmission spectrum of the second AMZ optical demultiplexer component 202. The first transmission spectrum is input to the second unit circuit UC2. The second transmission spectrum is determined by a product of the transmission spectrum of the first AMZ optical demultiplexer component 201 and the transmission spectrum of the third AMZ optical demultiplexer component 203. The second transmission spectrum is input to the third unit circuit UC3.

Ideally, the first transmission spectrum includes a peak waveform of the wavelength $\lambda 1$ and a peak waveform of the wavelength $\lambda 3$, and the second transmission spectrum includes a peak waveform of the wavelength $\lambda 2$ and a peak waveform of the wavelength $\lambda 4$.

In the first embodiment, the control circuit 251 controls the phase shifters 111, 121, and 131 in a direction, which increases power of a target output light spectrum. The control circuit 261 and the control circuit 262 control the phase shifters 141, 151, 161, 171, 181, and 191 in a direction, which reduces an unused spectral component. Therefore, light loss, crosstalk, and the like are reduced in the two transmission spectra output from the first unit circuit UC101.

In the second unit circuit UC2, the input first transmission spectrum is further separated into two transmission spectra by the first AMZ 10A.

One of the separated transmission spectra is transmitted through the second AMZ 20A and detected by the PD 81 connected to one of the output ports of the second AMZ 20A. Another separated transmission spectrum is transmitted through the third AMZ 30A and detected at a PD 82 connected to one output port of the third AMZ 30A.

The control circuit 52 controls the output power of the PD 81 and the output power of the PD 82 in a direction, in which the output powers increase, and the control circuit 63 and the control circuit 64 reduce the light components, which do not contribute to the outputs. With this configuration, an optical signal of the wavelength λ1 is output from the PD 81, and an optical signal of the wavelength λ3 is output from the PD 82.

Also, the third unit circuit UC3 performs the same operation, and an optical signal of the wavelength λ2 is output from the PD 83, and an optical signal of the wavelength λ4 is output from the PD 84.

By controlling the increase in power in the control circuit 251, it is possible to maximize the power of the transmission spectrum output to the unit circuit UC2 and the unit circuit UC3 at a later stage. By controlling a power increase at the control circuits 52 and 53, it is possible to maximize the power of light at each wavelength output from the PD 81 through the PD 84.

By the control circuits 261, 262, and 63-66 controlling the direction, in which a predetermined monitor output is reduced, it is possible to minimize optical components that do not contribute to an output of the optical demultiplexer 100.

After a certain period of time, when monitor light power is stabilized, heater power is also stabilized.

In the first embodiment, a plurality of AMZs are provided in each of the first AMZ optical demultiplexer component 201, the second AMZ optical demultiplexer component 202, and the third AMZ optical demultiplexer component 203, and the period of the transmission spectrum of one AMZ is an integral multiple of the period of the transmission spectrum of another AMZ. Therefore, it is possible to sufficiently suppress crosstalk even if there is some variation in the wavelength of an incoming WDM signal.

Figure 9:
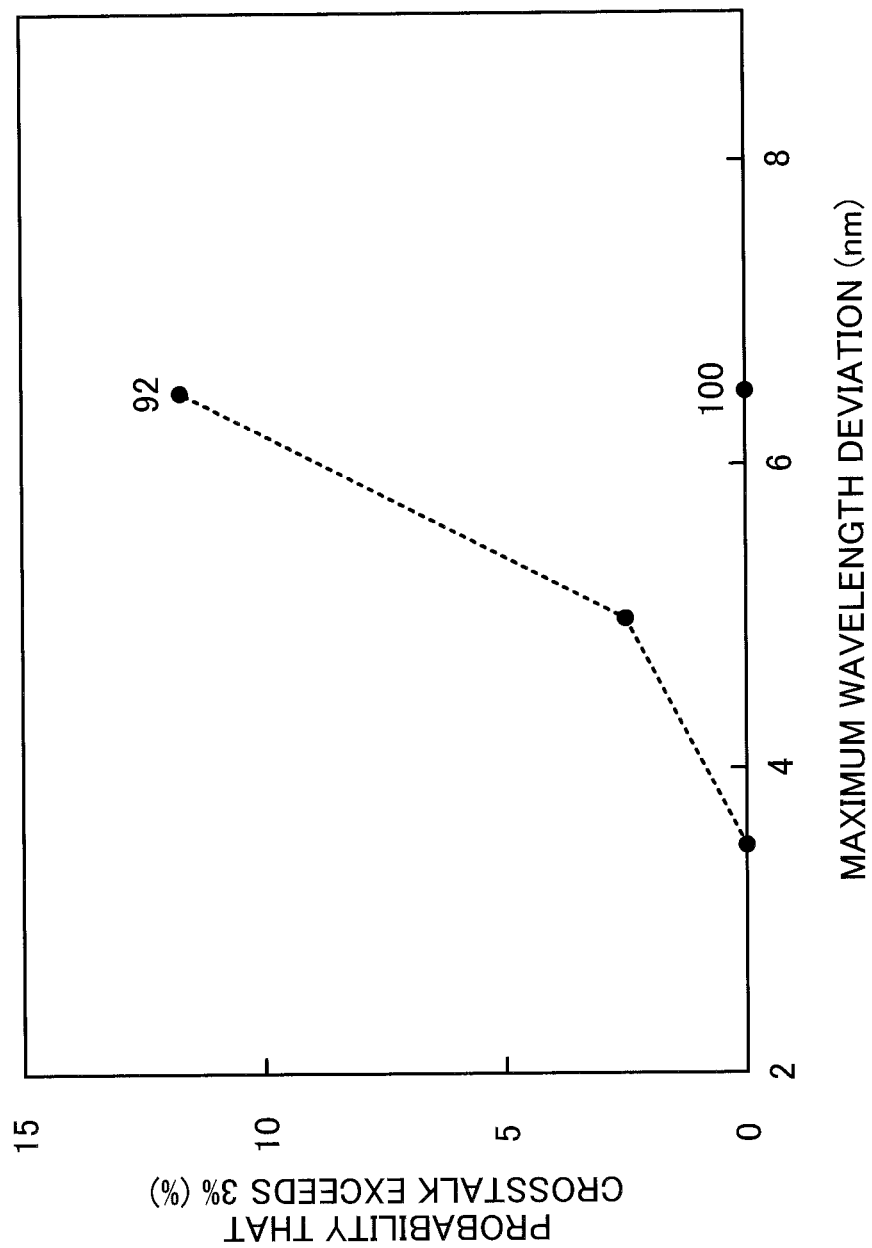
FIG. 9 is a diagram illustrating the optical demultiplexer in the first embodiment.

Next, an advantage according to the first embodiment will be described. FIG. 9 is a calculation result in a case in which an interval of a WDM signal optical wavelength (center) is 20 nm, and has a uniform wavelength deviation (the wavelength varies equally in a range of ±x with respect to a maximum wavelength deviation x). A horizontal axis represents the maximum wavelength deviation, and a vertical axis represents a probability of crosstalk exceeding 3%. FIG. 9 illustrates a characteristic of the optical demultiplexer 92 depicted in FIG. 7, and a characteristic of the optical demultiplexer 100 in this embodiment depicted in FIG. 8.

As depicted in FIG. 9, in the optical demultiplexer 92 depicted in FIG. 7, the probability of crosstalk exceeding 3% indicates approximately 0% in a case of the maximum wavelength deviation being 3.5 nm; however, the probability of crosstalk exceeding 3% indicates approximately 2.5% in a case of the maximum wavelength deviation being 5.0 nm. Furthermore, in a case of the maximum wavelength deviation being 6.5 nm, the probability of crosstalk exceeding 3% indicates approximately 11.8%, which greatly increases the probability of degradation to a level unable to be communicated.

On the other hand, in the optical demultiplexer 100 according to the first embodiment depicted in FIG. 8, in a case of the maximum wavelength deviation being 6.5 nm, the probability of crosstalk exceeding 3% indicates approximately 0%, and the crosstalk is significantly reduced and approximately suppressed.

The optical demultiplexer 100 depicted in FIG. 8 is provided with three waveguide pairs, one pair of which has a waveguide length difference (arm length difference) of 2ΔL and two pairs of which have a waveguide length of 4ΔL, in the AMZ of the input AT stage to which the DWM signal is first transmitted; however, a number of pairs is not limited to three, and may be any more pairs. In addition, although an effect is somewhat less than that of the three pairs, it is possible to obtain the effect of reducing the crosstalk even in a case in which the two pairs are used. In addition, the waveguide length difference in the AMZ is not limited to about twice the shortest waveguide length difference. Furthermore, in the first embodiment, a case in which a waveguide pair of the AMZ is increased only in an input AT stage is described; however, the same effect may be obtained by increasing the waveguide pair with respect to an AT other than the input AT stage.

The optical demultiplexer 100 described in FIG. 8 cascades into two stages using three unit circuits to obtain four outputs. Alternatively, the optical demultiplexer 100 according to the first embodiment may have an increased number of stages. For example, eight outputs may be obtained by connecting two output ports of the unit circuit UC2 of the optical demultiplexer 100 depicted in FIG. 8 and two output ports of the unit circuit UC3 with another unit circuit and cascading to three stages. That is, the optical demultiplexer 100 described in FIG. 8 has a two-stage AT structure; however, the structure is not limited to a two-stage AT structure, and the optical demultiplexer 100 may be formed to have a first-stage AT structure in a case in which the wavelength is divided into two wavelengths, a three-stage AT structure in a case in which the wavelength is divided into eight wavelengths, or the N-stage AT structure in a case in which the wavelength is divided into $2^N$ wavelengths. In this case, a relationship between the number of wavelengths and the number of stages may not necessarily be the above-mentioned relationship, because WDM signals may not be equally spaced.

In a case in which the unit circuits are cascaded to multiple stages, the arm length difference of the AMZ having a smallest arm length difference among the AMZs of the unit circuits at the m-th stage is ΔLm, and the arm length difference of the AMZ having the smallest arm length difference among the AMZ of the unit circuit at the (m−1)-th stage is ΔLm−1, arm length difference ΔLm is represented by ΔLm=ΔLm−½.

The optical demultiplexer 100 according to the first embodiment is able to be used for long- and medium-distance optical communications such as a core network and a metro network, and is able to be applied to short-distance optical communications such as between servers and boards of a datacenter.

Second Embodiment

Figure 10:
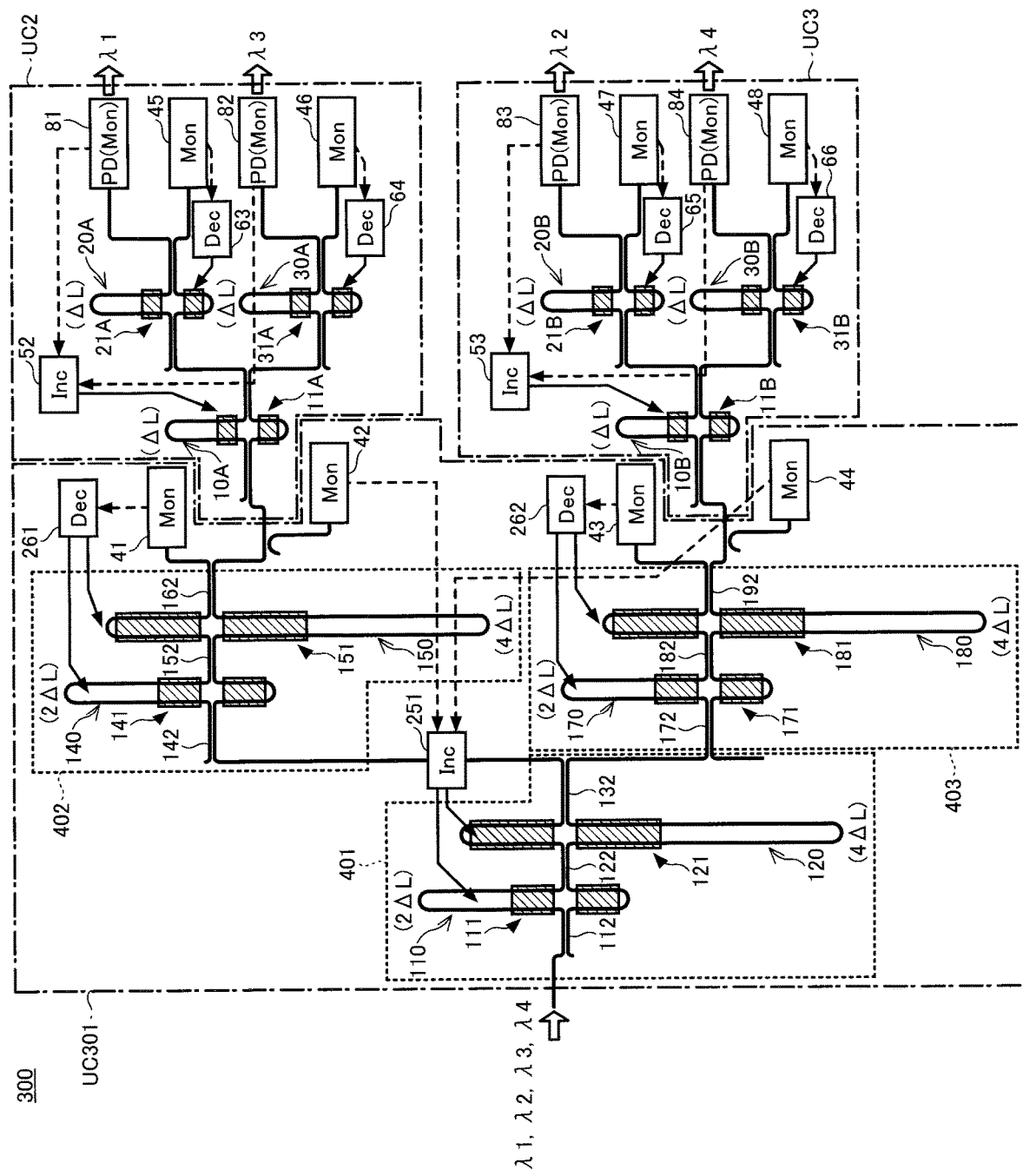
FIG. 10 is a diagram illustrating an optical demultiplexer in a second embodiment.

Next, an optical demultiplexer 300 according to a second embodiment will be described. As depicted in FIG. 10, in the optical demultiplexer 300 in the second embodiment, the unit circuits are cascaded in multiple stages in a tree structure. Specifically, the second unit circuit UC2 and the third unit circuit UC3 are respectively connected to the two output ports of a first unit circuit UC 301.

The optical demultiplexer 300 includes four output ports in total: two output ports of the second unit circuit UC2 and two output ports of the third unit circuit UC3, each wavelength in a WDM signal being multiplexed from the wavelength λ1 to the wavelength λ4. A distance between the wavelengths to be separated is determined by the arm length difference. An arm length difference of each AMZ of the second unit circuit UC2 and the third unit circuit UC3 is set to ΔL.

The first unit circuit UC 301 includes a first AMZ optical demultiplexer component 401 having the AMZ 110 and the AMZ 120, a second AMZ optical demultiplexer component 402 having the AMZ 140 and the AMZ 150, and a third AMZ optical demultiplexer component 403 having the AMZ 170 and the AMZ 180.

The two output ports of the AMZ 120, which are regarded as outputs of the first AMZ optical demultiplexer component 401, are respectively connected to the input of the AMZ 140 of the second AMZ optical demultiplexer component 402 and the input of the AMZ 170 of the third AMZ optical demultiplexer component 403 through the 2×2 coupler 132.

The unit circuit UC 301 includes the first monitor 41 connected to one of the two output ports of the AMZ 150 of the second AMZ optical demultiplexer component 402 and the second monitor 42 on another output port. The unit circuit UC 301 includes the third monitor 43 connected to one of the two output ports of the AMZ 180 of the third AMZ optical demultiplexer component 403 and the fourth monitor 44 on another output port.

The output port on a side, on which the second monitor 42 of the AMZ 150 of the second AMZ optical demultiplexer component 402 is provided, is one of the output ports of the unit circuit UC 301. Another output port of the unit circuit UC 301 is regarded as an output port at which the fourth monitor 44 of the AMZ 180 of the third AMZ optical demultiplexer component 403 is provided.

Results of the second monitor 42 and the fourth monitor 44 are input to the control circuit 251. A monitor result of the first monitor 41 is input to a control circuit 261, and a monitor result of the third monitor 43 is input to the control circuit 262.

The control circuit 251 controls the transmission characteristics of the AMZ 110 and the AMZ 120 of the first AMZ optical demultiplexer component 401 based on the monitor results of the second monitor 42 and the fourth monitor 44. The control circuit 261 controls the transmission characteristics of the AMZ 140 and the AMZ 150 of the second AMZ optical demultiplexer component 402 based on the monitor result of the first monitor 41. The control circuit 262 controls the transmission characteristics of the AMZ 170 and the AMZ 180 of the third AMZ optical demultiplexer component 403 based on the monitor result of the third monitor 43.

Figure 11:
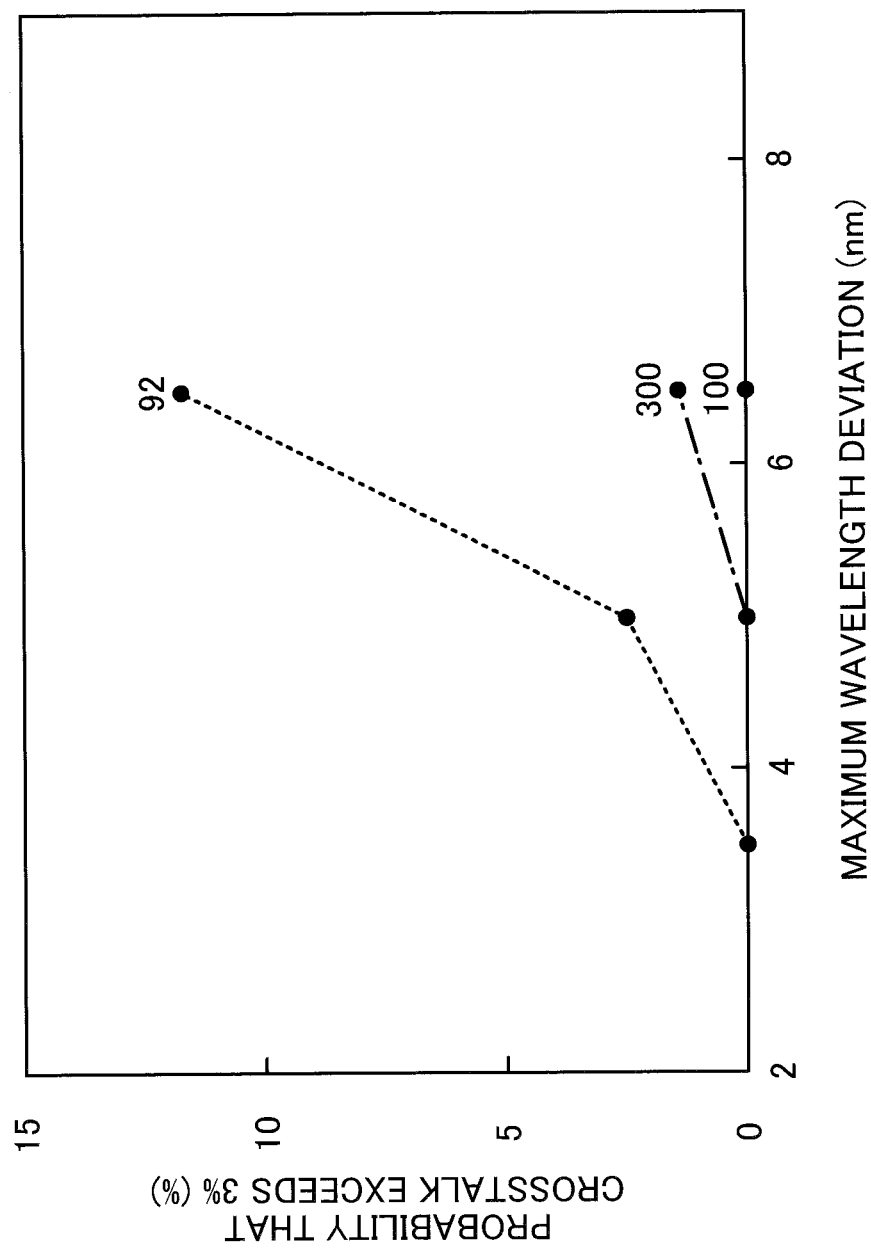
FIG. 11 is a diagram for explaining an effect of an optical demultiplexer in the second embodiment.

Next, an effect according to the second embodiment will be described. FIG. 11 is a diagram illustrating a calculation result in a case in which a WDM signal optical wavelength interval (center) is 20 nm, and has a uniform wavelength deviation (the wavelength varies equally in a range of ±x with respect to a maximum wavelength deviation x). A horizontal axis indicates a maximum wavelength deviation and a vertical axis is a probability of crosstalk exceeding 3%. FIG. 11 is a diagram illustrating a characteristic of the optical demultiplexer 92 depicted in FIG. 7, a characteristic of the optical splitter 100 in the first embodiment depicted in FIG. 8, and a characteristic of the optical splitter 300 in the second embodiment depicted in FIG. 10.

As depicted in FIG. 11, in the optical demultiplexer 300 depicted in FIG. 10, for a case of the maximum wavelength deviation being 5.0 nm, the probability that the crosstalk exceeds 3% is approximately 0%, but when the maximum wavelength deviation is 6.5 nm, the probability that the crosstalk exceeds 3% is approximately 1.5%. Accordingly, although the optical demultiplexer 300 according to the second embodiment does not attain the same effect of the optical demultiplexer 100 in the first embodiment, the optical demultiplexer 300 attains an effect of reducing crosstalk more than the optical demultiplexer 92 depicted in FIG. 7.

Contents other than the above described contents are the same as those in the first embodiment, and explanations thereof will be omitted.

Third Embodiment

Figure 12:
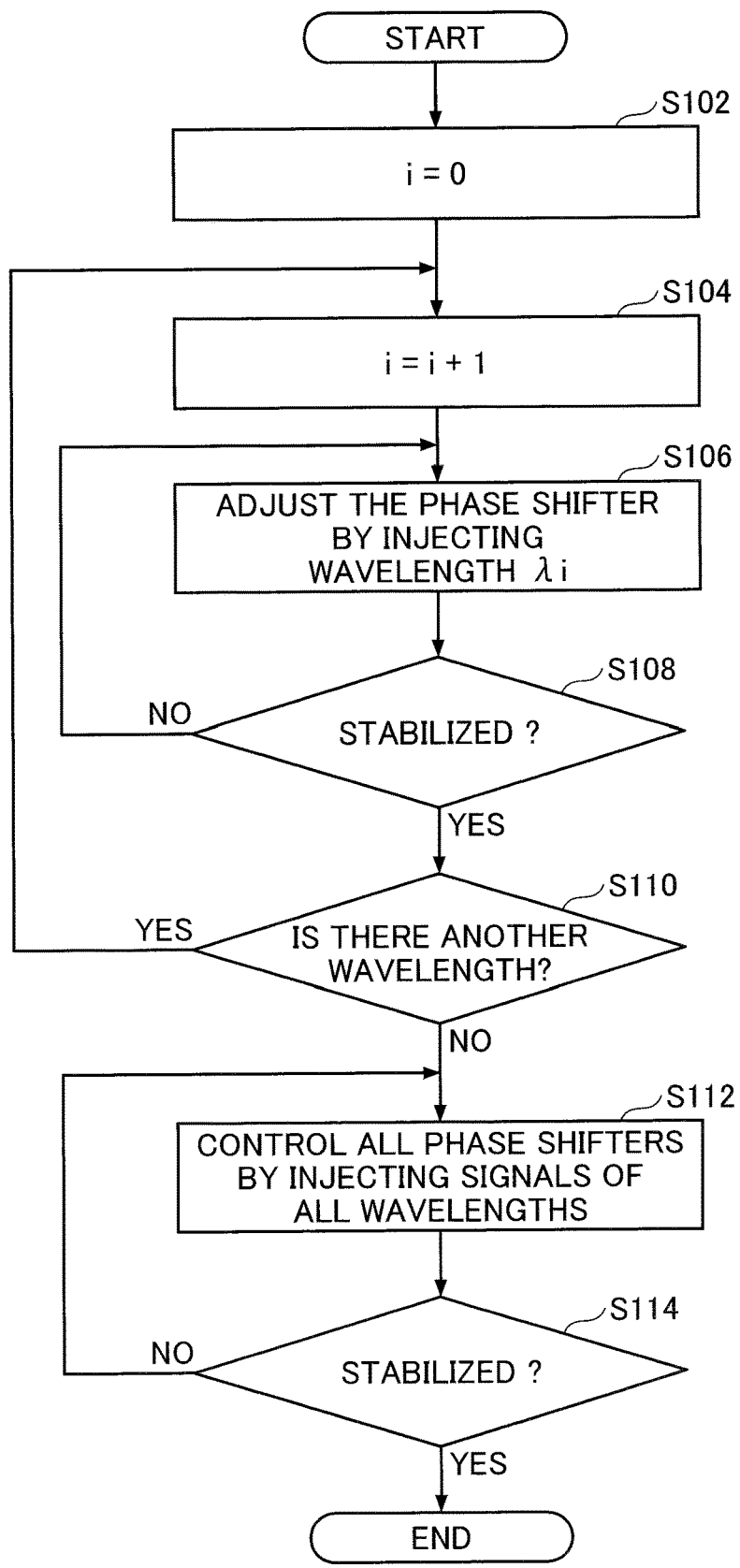
FIG. 12 is a flowchart for explaining a wavelength multiplexing method in a third embodiment.

Next, a third embodiment will be described. The third embodiment corresponds to a method for controlling a wavelength division multiplexing at an optical demultiplexer in the first embodiment or the second embodiment. FIG. 12 is a flowchart for explaining the method for controlling the wavelength division multiplexing according to the third embodiment. As an example, the method for controlling the wavelength division multiplexing by the optical demultiplexer 100 according to the first embodiment will be described; however, the method is also applicable for the optical demultiplexer 300 according to the second embodiment.

The method for controlling the wavelength division multiplexing according to the third embodiment controls the entire wavelength after controlling the phase shifters in a direction in which power increases or in a direction in which power decreases, for each wavelength to be multiplexed. This control ensures a correspondence between each wavelength and a channel, and reduces light loss and crosstalk.

First, in step 102 (S102), a value of i with respect to a wavelength $\lambda i$ is initially set to 0.

Next, in step 104 (S104), a new value of i is set by adding 1 to a value of i. Hence, the wavelength $\lambda i$ is selected.

Next, in step 106 (S106), by injecting the selected wavelength $\lambda i$ to the optical demultiplexer, the phase shifter provided in the AMZ located between the input port and the output port of the wavelength $\lambda i$ is adjusted. The adjusting of the phase shifters is performed by controlling phase shifters in a direction, in which power monitored by ports for outputting light of the unit circuit increases, and by controlling the phase shifters at the second stage and the third stage in a direction, in which power monitored by a port that does not contribute to output light decreases. A phase shifter, which is not involved in controlling the wavelength $\lambda i$, is not controlled, and an output signal in another channel is substantially fixed.

Next, in step 108 (S108), it is determined whether or not the output is stabilized in the channel of the wavelength $\lambda i$ for the selected wavelength $\lambda i$. In a case in which the output is stabilized in the channel having the wavelength $\lambda i$, this process advances to step S110. In a case in which the output is not stabilized in the channel of the wavelength $\lambda i$, the process goes back to step S106 and the phase shifters are adjusted.

Next, in step 110 (S110), it is determined whether there are other wavelengths. If there are other wavelengths, the process goes back to step 104. If there are no other wavelengths, it is determined that the adjusting of the phase shifter is completed for all wavelengths, and the process advances to step 112.

Next, in step 112 (S112), signals of all wavelengths are injected at one time to adjust all phase shifters until outputs of all channels are stabilized in a state in which the signals of all wavelengths are injected.

Next, in step 114 (S114), it is determined whether or not the outputs of all channels are stabilized. When the outputs of all channels are stabilized, the process ends. When the outputs of all channels are not stabilized, the process goes back to step S112 and the phase shifters are adjusted.

Steps 112 and 114 are conducted to ensure a wavelength separation when a WDM signal is actually input.

If output power is stabilized at each of the wavelengths multiplexed in step 114, actual communication is initiated. In FIG. 12, the adjusting is conducted in an order from a shorter wavelength. However, the transmission characteristics of the AMZs may be adjusted on an optical path related to each of the wavelengths, and thus, the wavelengths may be input in any order.

The method for controlling the wavelength division multiplexing according to the third embodiment will be described in more detail with reference to FIG. 13 through FIG. 16.

Figure 13:
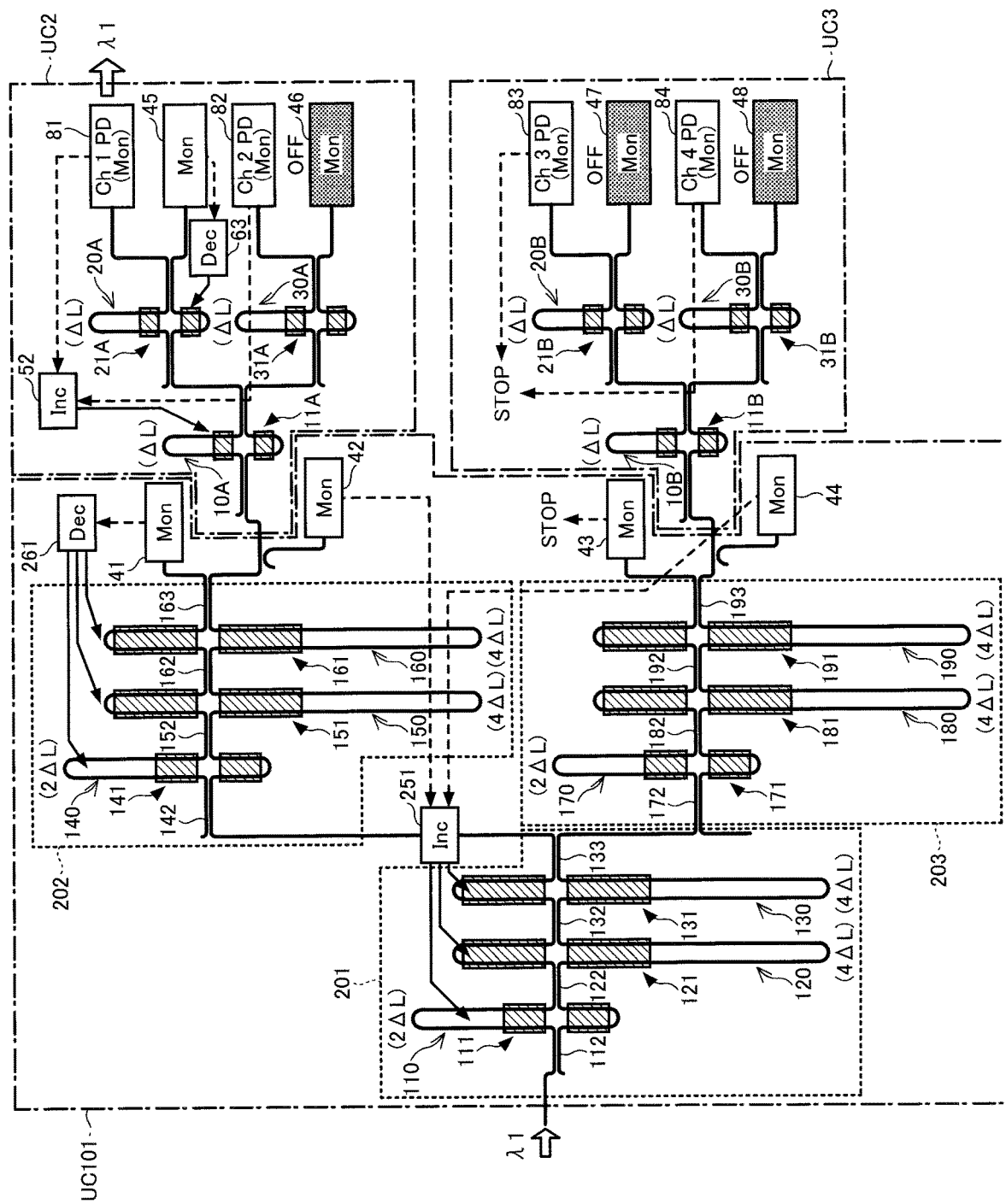
FIG. 13 is a diagram for explaining the wavelength multiplexing method in the third embodiment (part 1)

First, as depicted in FIG. 13, light of the wavelength λ1 is injected to the optical demultiplexer 100 to adjust the PD 81 (channel 1) that receives light of the wavelength λ1 from the input port. Specifically, the first AMZ optical demultiplexer component 201, the second AMZ optical demultiplexer component 202, the first AMZ 10A, and the phase shifters 111, 121, 131, 141, 151, 161, 11A, and 21A of the second AMZ 20A are adjusted respectively.

The phase shifters 111, 121, and 131 included in the first AMZ optical demultiplexer component 201 are controlled by the control circuit 251 to increase the sum of the output power of the second monitor 42 and the output power of the fourth monitor 44.

The phase shifters 141, 151, and 161 included in the second AMZ optical demultiplexer component 202 are controlled in a direction, in which the output power of the first monitor 41 is reduced by the control circuit 261.

The phase shifter 11A of the first AMZ 10A is controlled by the control circuit 52 in a direction, in which a sum of the output power of the PD 81 and the output power of the PD 82 increases.

The phase shifter 21A of the second AMZ20A is controlled by the control circuit 63 in a direction, in which the output power of the monitor 45 is reduced.

The input value to the third monitor 43, which is not used to adjust the wavelength λ1, and the phase shifter corresponding to the monitors 46 to 48 are fixed and the control circuit 52 or the like is stopped.

When the output power from the PD 81 is stabilized by adjusting the phase shifters 111, 121, 131, 141, 151, 161, 11A, and 21A, the adjusting of the wavelength λ1 is completed and light of a next wavelength is injected.

Figure 14:
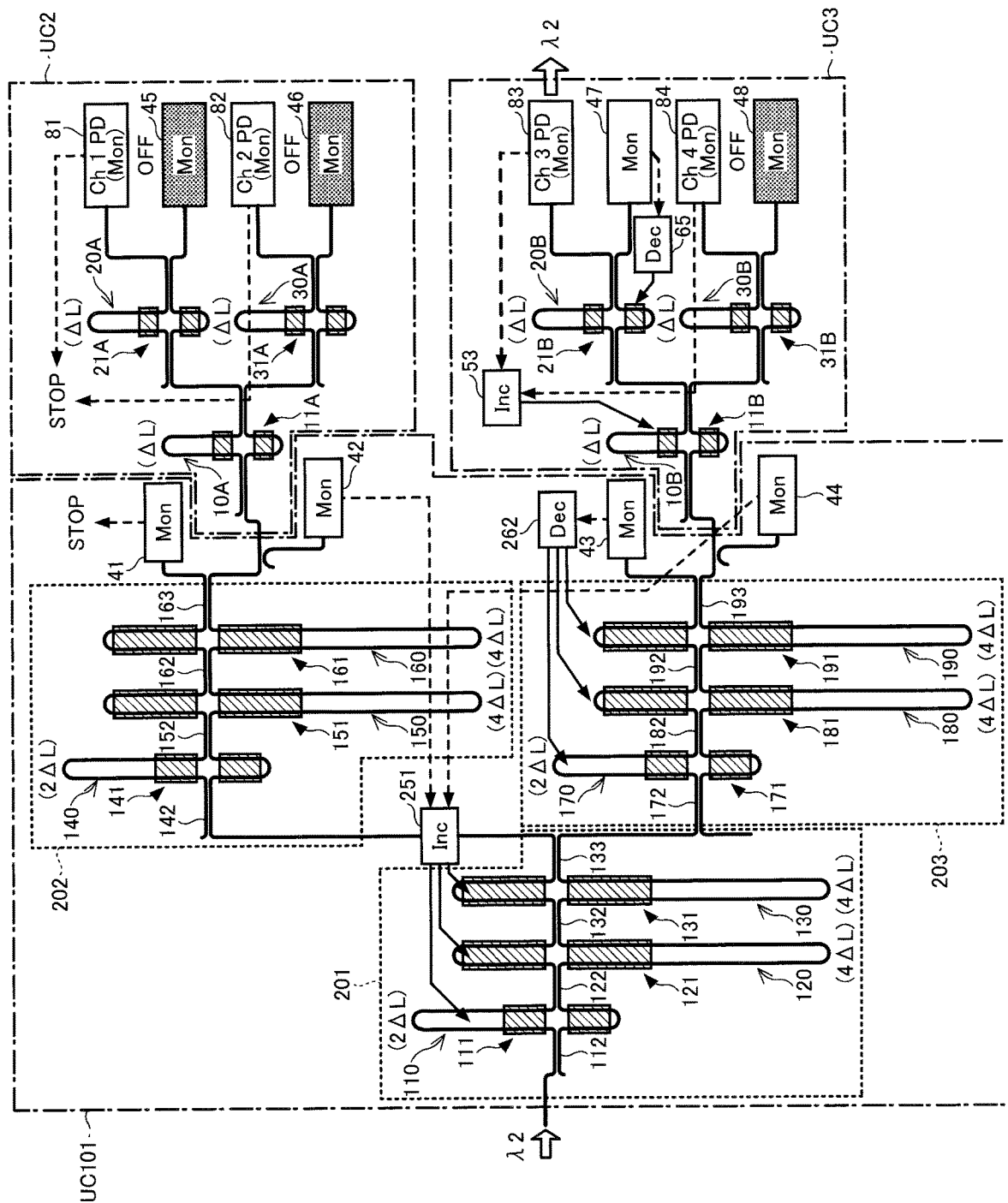
FIG. 14 is a diagram for explaining the wavelength multiplexing method in the third embodiment (part 2)

Next, as depicted in FIG. 14, the light of the wavelength λ2 is injected to adjust the PD 83 (channel 3). Specifically, the control circuit 251 controls the phase shifters 111, 121, and 131 included in the first AMZ optical demultiplexer component 201 in a power increase direction. The control circuit 262 controls the phase shifters 171, 181, and 191 included in the third AMZ optical demultiplexer component 203 in a power decrease direction. The control circuit 53 controls the phase shifter 11B of the first AMZ 10B in the power increase direction. The control circuit 65 controls the phase shifter 21B of the second AMZ 20B in the power decrease direction.

When the output power from the PD 83 is stabilized by adjusting the phase shifters 111, 121, 131, 171, 181, 191, 11B, and 21B, the control of the wavelength λ3 is terminated and light of the next wavelength is injected.

Figure 15:
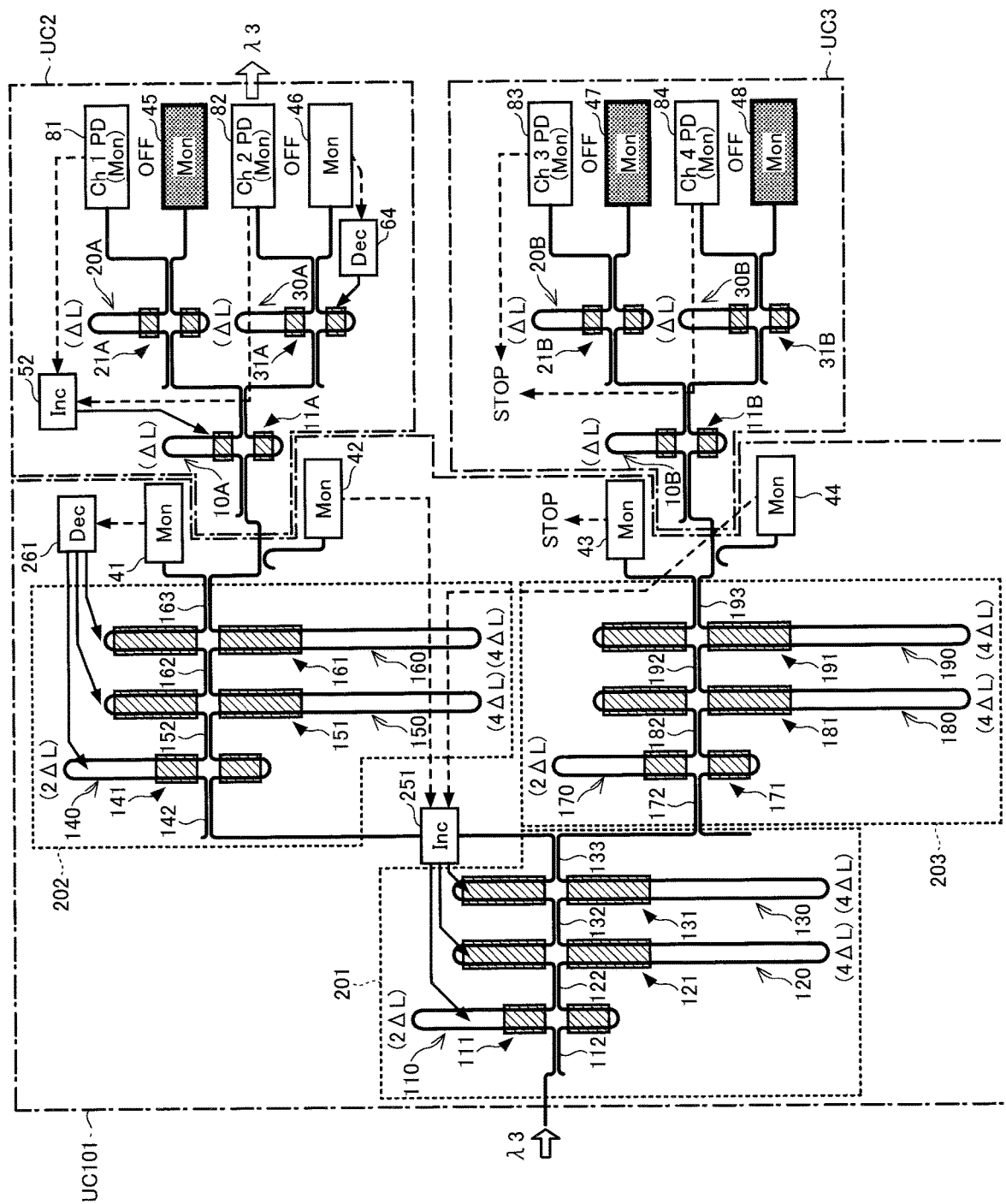
FIG. 15 is a diagram for explaining the wavelength multiplexing method in the third embodiment (part 3)

Then, as depicted in FIG. 15, the light of the wavelength λ3 is injected to adjust the PD 82 (channel 2). Specifically, the control circuit 251 controls the phase shifters 111, 121, and 131 included in the first AMZ optical demultiplexer component 201 in the power increase direction. The control circuit 261 controls the phase shifters 141, 151, and 161 included in the second AMZ optical demultiplexer component 202 in the power decrease direction. The control circuit 52 controls the phase shifter 11A of the first AMZ 10A in the power increase direction. The control circuit 64 controls the phase shifter 31A of the third AMZ 30A in the power decrease direction.

When the output power from the PD 82 is stabilized by adjusting the phase shifters 111, 121, 131, 141, 151, 161, 11A, and 31A, the control of the wavelength λ3 is terminated and light of the next wavelength is injected.

Figure 16:
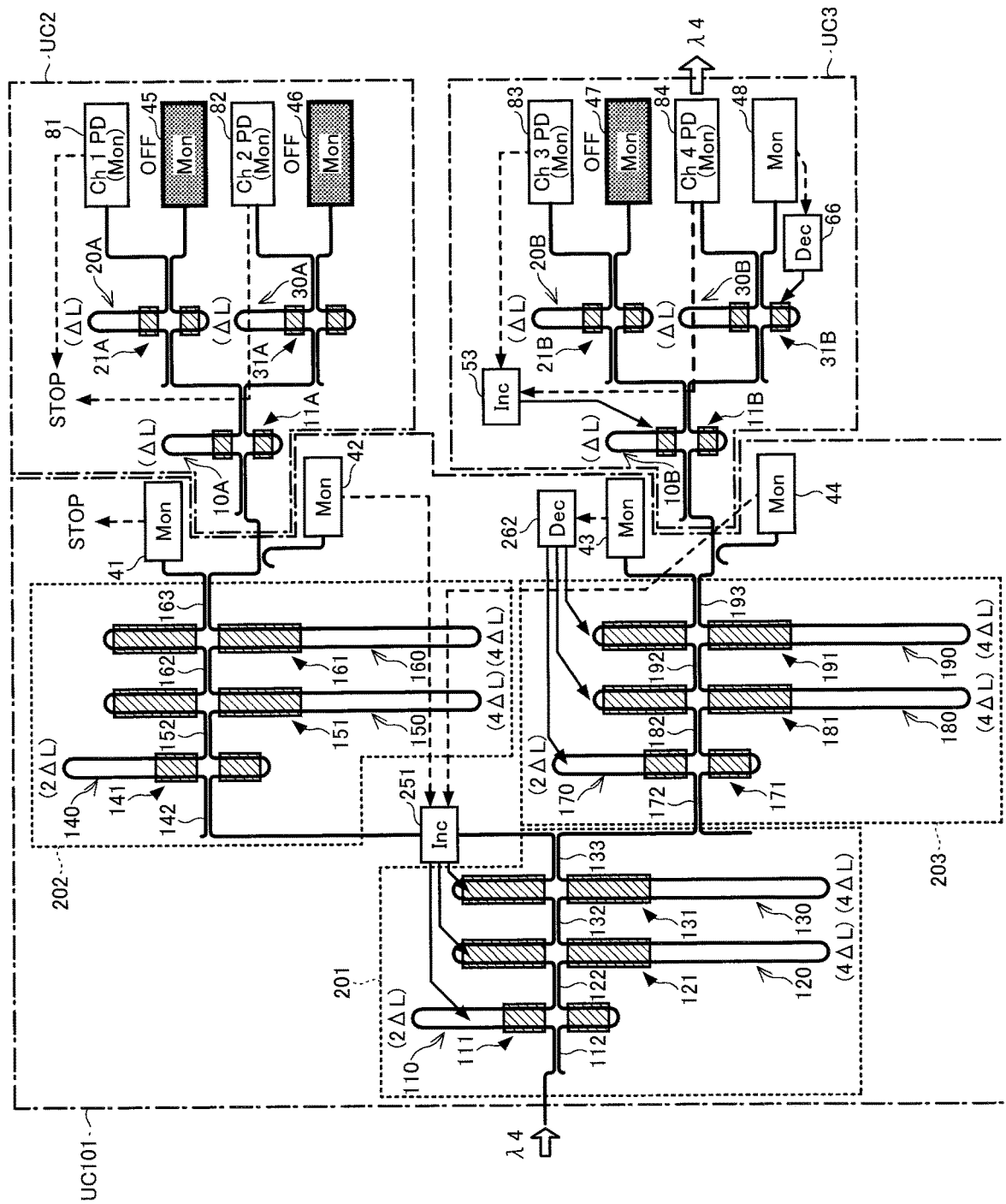
FIG. 16 is a diagram for explaining the wavelength multiplexing method in the third embodiment (part 4)

Next, as depicted in FIG. 16, light of the wavelength λ4 is injected to adjust the PD 84 (channel 4). Specifically, the control circuit 251 controls the phase shifters 111, 121, and 131 included in the first AMZ optical demultiplexer component 201 in the power increase direction. The control circuit 262 controls the phase shifters 171, 181, and 191 included in the third AMZ optical demultiplexer component 203 in the direction of power reduction. The control circuit 53 controls the phase shifter 11B of the first AMZ 10B in the power increase direction. The control circuit 66 controls the phase shifter 31B of the third AMZ 30B in the power decrease direction.

The phase shifters 111, 121, 131, 171, 181, 191, 11B, and 31B are adjusted to terminate control of the wavelength λ4 upon stabilizing the output power from the PD 83.

By performing the steps of FIG. 13 to FIG. 16, the wavelengths of the WDM are associated with each output port.

Figure 17:
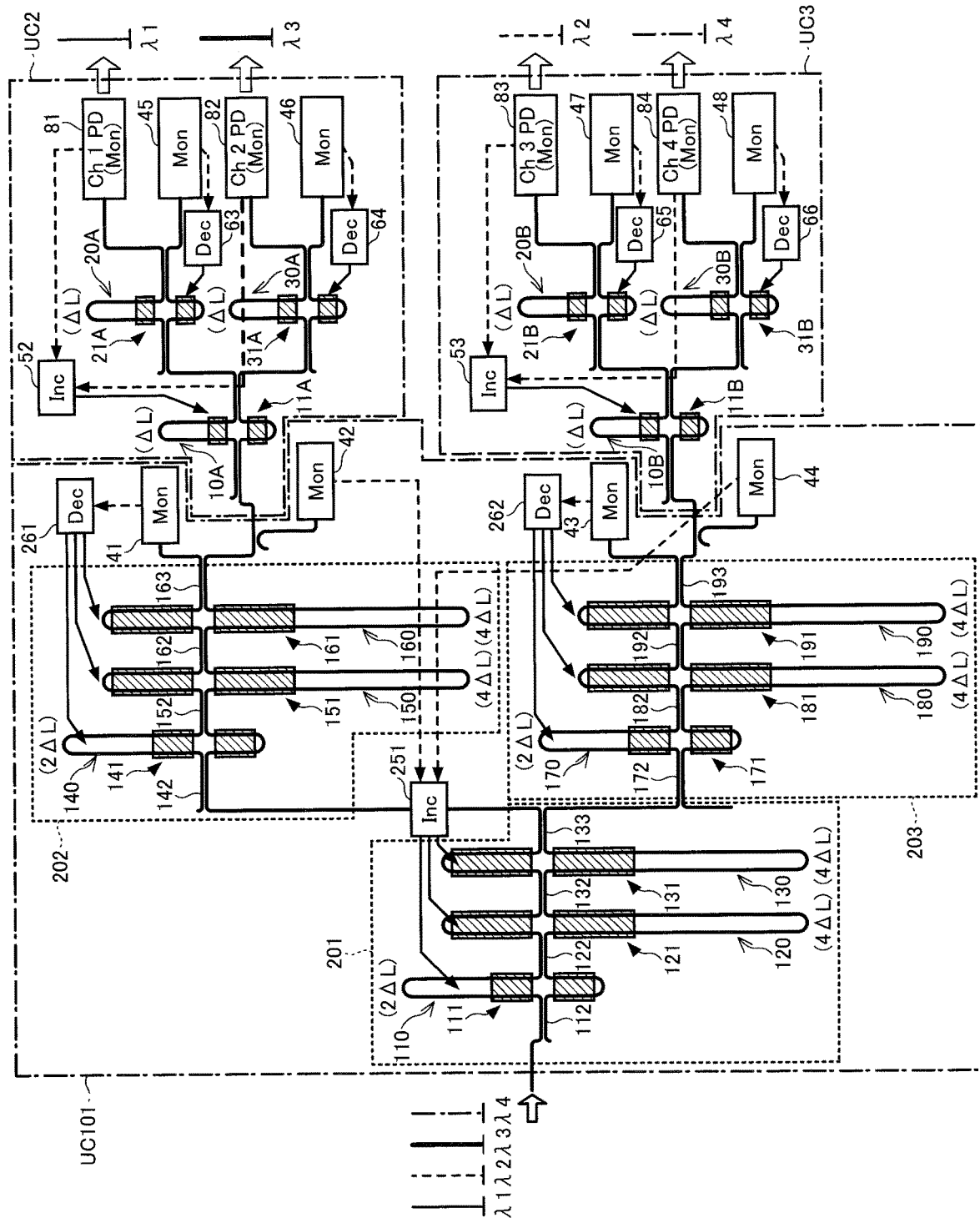
FIG. 17 is a diagram for explaining the wavelength multiplexing method in the third embodiment (part 5)

FIG. 17 illustrates a state, in which light of all wavelengths λ1 to λ4 is injected to the optical demultiplexer 100, control is performed for each AMZ, and communication is initiated after the output power is stabilized at each of the wavelengths λ1 to λ4. The control for injecting and adjusting the light of all wavelengths λ1 to λ4 depicted in FIG. 17 is suitably conducted during a use of the optical demultiplexer 100.

Fourth Embodiment

A fourth embodiment is a schematic diagram of an optical transport apparatus in which the optical demultiplexer according to the first embodiment or the second embodiment is used. An optical transport apparatus 500 is used, for example, as a network node in a WDM system. In the fourth embodiment, a case, in which the optical demultiplexer 100 according to the first embodiment is used, will be described. However, the optical transport apparatus 500 is also applicable to the optical demultiplexer 300 according to the second embodiment.

Figure 18:
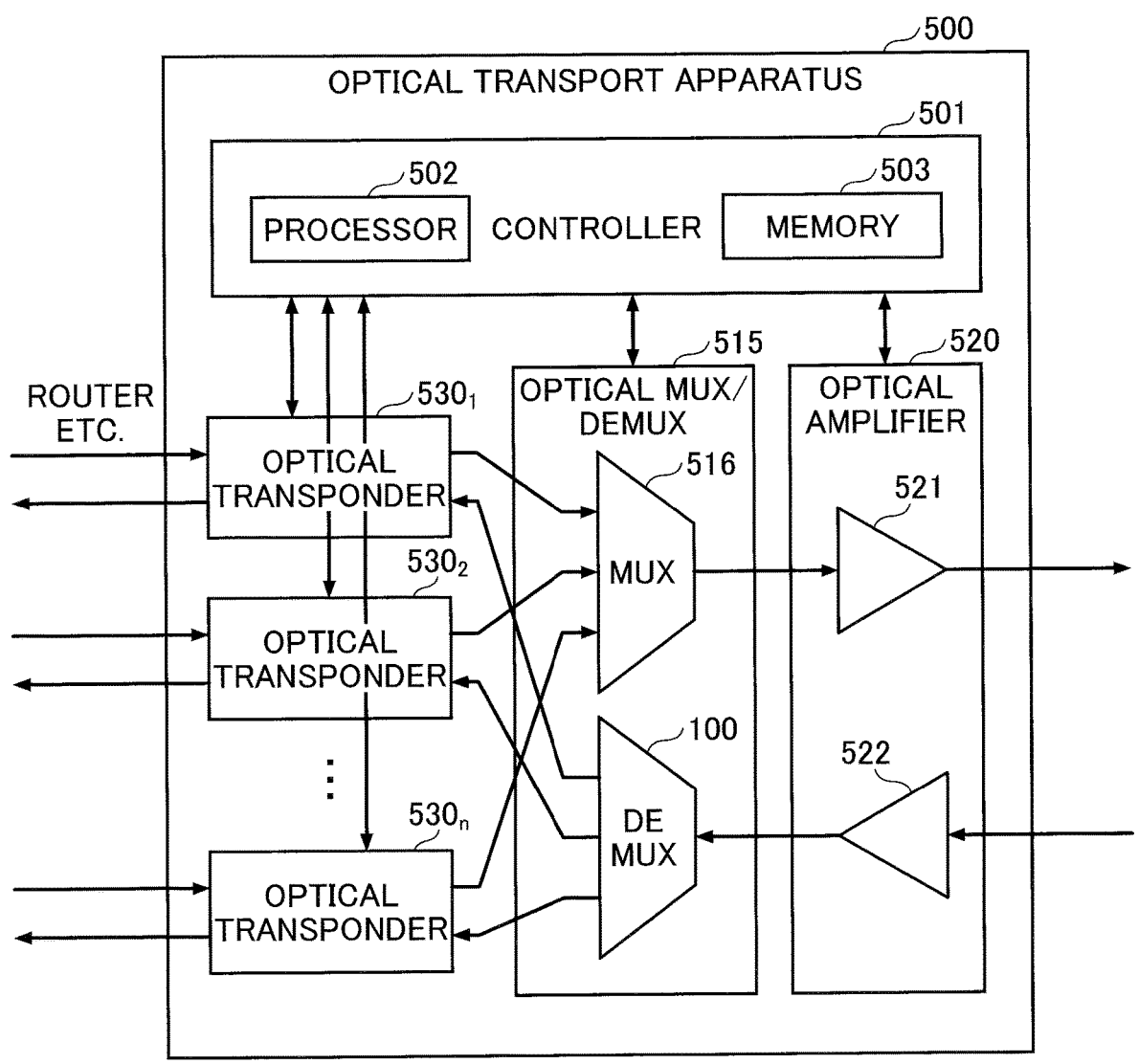
FIG. 18 is a diagram illustrating a configuration of an optical transport apparatus in a fourth embodiment.

As depicted in FIG. 18, the optical transport apparatus 500 in the fourth embodiment includes a plurality of transponders $530_1$ to $530_n$ (collectively referred to as "transponders 530" as appropriate), a controller 501, an optical demultiplexer 515, and an optical amplifier 520. The controller 501 includes a processor 502 and a memory 503 to control an operation of each of the transponders 530, the optical demultiplexer 515, and the optical amplifier 520.

Signals from forwarding nodes such as routers, optical switches, and the like (hereinafter collectively referred to as "routers") are converted into optical wavelengths at a transmission section of each transponder 530. Signals, to which optical wavelengths are converted, are processed by a wavelength multiplexing at a multiplexer ("MUX") 516 of the optical multiplexer 515, amplified by optical amplifier 521, and output to a transmission path on a network side. The light received from the network is amplified by an optical amplifier 522, and then, wavelengths of the light are separated by the optical demultiplexer 100 (denoted as "DEMUX") in the first embodiment. Optical signals of each wavelength split in the optical demultiplexer 100 are received at a receiver of each transponder 530 and are transmitted to a router side.

In the optical demultiplexer 100, the control circuits 251, 52, 53, 261, 262, and 63 to 66 for controlling the phase shifters of each AMZ may be implemented by a component of the processor 502. It is possible for the optical demultiplexer 100 to appropriately separate light for each wavelength by control in the power increase direction and in the power decrease direction as described above.

In FIG. 18, all wavelengths are processed by an optical add/drop at the optical transport apparatus 500. Alternately, an optical switch may be to add, drop or throw any wavelengths between optical multiplexer 516 and optical amplifier 521 and between optical demultiplexer 100 and optical amplifier 522.

Figure 19:
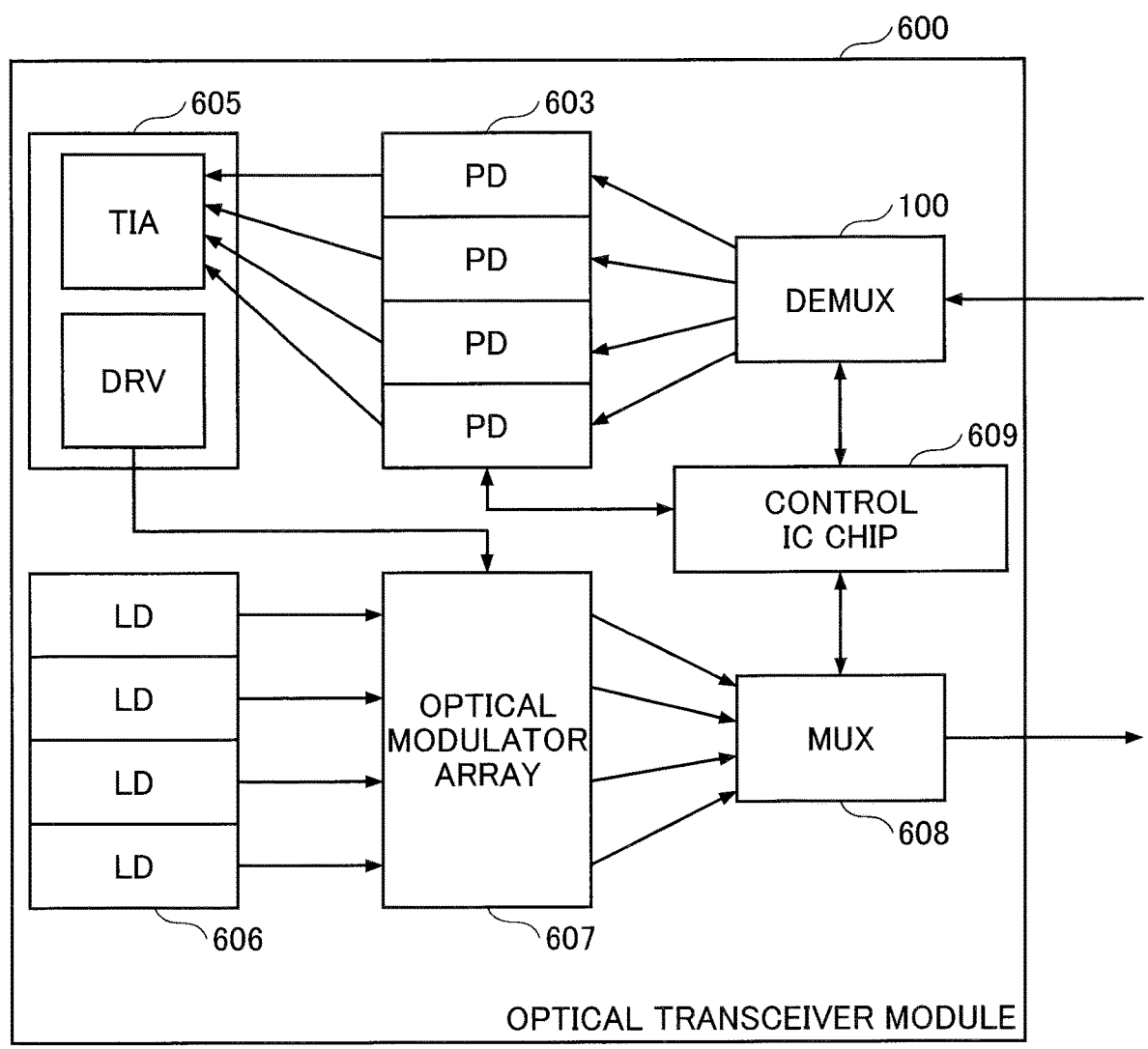
FIG. 19 is a diagram illustrating a configuration of an optical transceiver module in the fourth embodiment.

FIG. 19 is a schematic diagram of an optical transceiver module 600 according to the fourth embodiment. The optical transceiver module 600 is also an example of an optical transport apparatus, and performs optical transmission between servers or between Large Scale Integrated circuits (LSIs) mounted in server blades. The optical transceiver module 600 includes the optical demultiplexer (DEMUX) 100, a photodetector (PD) array 603, an electric circuit chip 605, a laser diode (LD) array 606, a modulator array 607, an optical wave combiner (MUX) 608, and a control circuit chip 609. The control circuits 251, 52, 53 and 261, 262, and 63 to 66 in the optical demultiplexer 100 may be implemented by a part of the control circuit chip 609.

The input light signal is separated into light of each wavelength by the optical demultiplexer (DEMUX) 100 and is received at the corresponding PD of the photodetector array 603. The photocurrent output from each PD is converted into an electric signal by a transimpedance amplifier (TIA) of the electric circuit chip 205 and output to an external electronic circuit such as an LSI or a digital signal processor.

Light of each wavelength output from the LD array 606 is input to a corresponding light modulator of the modulator array 607. A set of drivers (DRV) of the electric circuit chip 205 generates high-frequency drive signals based on data signals input externally to modulate light input to each optical modulator of the modulator array 607. The modulated optical signals of the respective wavelengths are multiplexed by the optical multiplexer (MUX) 608 and output to an optical interconnect such as a fiber optic cable.

In the optical transceiver module 600, the optical demultiplexer (DEMUX) 100 is controlled to separate light of a desired wavelength at each output port. Light loss, crosstalk, and the like are controlled in each channel, and light of each wavelength is accurately separated.

The embodiments have been described in detail above, but are not limited to any particular embodiment, and various modifications and variations are possible within the scope of the appended claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical demultiplexer that separates light including a plurality of wavelengths into light of respective wavelengths, comprising:
    optical demultiplexer components each including, N 2×2 couplers where N is 2 or more, and N−1 Asymmetric Mach-Zehnder interferometers each provided with phase shifters, the N−1 Asymmetric Mach-Zehnder interferometers being respectively arranged among the N 2×2 couplers;
    unit circuits each including three of the optical demultiplexer components having a same structure and being cascaded in a tree structure,
        wherein the unit circuits are cascaded in the tree structure,
        in the optical demultiplexer components having the same structure, a combination of arm length differences in waveguide pairs is the same with respect to the N−1 Asymmetric Mach-Zehnder interferometers in which the phase shifters are arranged, and
        in three of the optical demultiplexer components in at least one of the unit circuits, N is three or more; and
    control circuits each of which controls the phase shifters arranged in a corresponding optical demultiplexer component of a corresponding unit circuit in order to increase or decrease a value of a function having, as an argument, a power value acquired by a monitor from among monitors arranged at four optical waveguides at an output side of the corresponding unit circuit.

2. The optical demultiplexer as claimed in claim 1, wherein $\Delta L_m = \Delta L_{m-1}/2$ is satisfied, where
    $\Delta L_m$ denotes a minimum arm length difference in one or more Asymmetric Mach-Zehnder interferometers at a m-th unit circuit among the N−1 Asymmetric Mach-Zehnder interferometers, and
    $\Delta L_{m-1}$ denotes a minimum arm length difference in one or more Asymmetric Mach-Zehnder interferometers at an (m−1)-th unit circuit among the N−1 Asymmetric Mach-Zehnder interferometers.

3. The optical demultiplexer as claimed in claim 1, wherein the phase shifters include one or more heaters.

4. The optical demultiplexer as claimed in claim 1, wherein each of the control circuits repeats
    determining a direction, in which a phase representing an increase or a decrease of a power value acquired by a corresponding monitor of the monitors changes of the monitors changes, by detecting the increase or the decrease of the power value acquired by the corresponding monitor in order to change a phase of corresponding phase shifters of the phase shifters in a direction for the power value acquired by the corresponding monitor to increase or decrease, the power value being from among the power values, and
    changing the phase of the corresponding phase shifters based on the determined direction.

5. An optical transport apparatus used in a wavelength division multiplexing communication, comprising an optical demultiplexer as claimed in claim 1.

6. A method of controlling optical demultiplexing, comprising:
    inputting light of one of the plurality of wavelengths to an input port of the optical demultiplexer as claimed in claim 1;
    adjusting a transmission characteristic of each of one or more Asymmetric Mach-Zehnder interferometers positioned between the input port and an output port for outputting the light of the one of the plurality of wavelengths, among the N−1 Asymmetric Mach-Zehnder interferometers, repeating the adjusting of the transmission characteristic and a stabilization by switching a wavelength to be input to the input port, after the stabilization of the one wavelength, and controlling the N−1 Asymmetric Mach-Zehnder interferometers of the optical demultiplexer at one time by injecting light including at least the plurality of wavelengths in response to the adjusting with respect to each of the plurality of wavelengths.

* * * * *